(12) United States Patent
Hankawa et al.

(10) Patent No.: US 7,561,343 B2
(45) Date of Patent: Jul. 14, 2009

(54) ELECTRONIC IMAGE PICKUP APPARATUS USING ZOOM LENS SYSTEM

(75) Inventors: Masashi Hankawa, Hachioji (JP); Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 144 days.

(21) Appl. No.: 11/900,309

(22) Filed: Sep. 10, 2007

(65) Prior Publication Data

US 2008/0084615 A1   Apr. 10, 2008

(30) Foreign Application Priority Data

Oct. 10, 2006   (JP) .............................. 2006-276137

(51) Int. Cl.
  *G02B 15/14*   (2006.01)
  *G02B 9/08*   (2006.01)
(52) U.S. Cl. ...................................... 359/683; 359/738
(58) Field of Classification Search ................. 359/676, 359/683, 738–740
  See application file for complete search history.

(56) References Cited

U.S. PATENT DOCUMENTS 7,113,345 B2   9/2006   Mihara et al.
7,466,500 B2 *   12/2008   Souma et al. ............... 359/738
2003/0193722 A1   10/2003   Mihara
2006/0002694 A1   1/2006   Mihara et al.

FOREIGN PATENT DOCUMENTS

JP   2005-121799   5/2005

* cited by examiner

*Primary Examiner*—Scott J Sugarman
(74) *Attorney, Agent, or Firm*—Kenyon & Kenyon LLP

(57) ABSTRACT

There is disclosed an electronic image pickup apparatus including an aperture stop disposed on an optical path reflected by a reflective surface of a first lens unit and having a non-circular aperture in a state in which an area of an aperture of the aperture stop is maximized, and a lens arranged closest to an image side on an optical path extending from the reflective surface to an image surface and having a non-circular shape, each of the shape of the non-circular aperture of the aperture stop and the outer shape of the lens is formed such that a length of the aperture which in a direction along an incident optical axis which enters the first lens unit is smaller than that of which in a direction vertical to the incident optical axis which enters the first lens unit and a reflected optical axis reflected by the reflective surface.

13 Claims, 11 Drawing Sheets

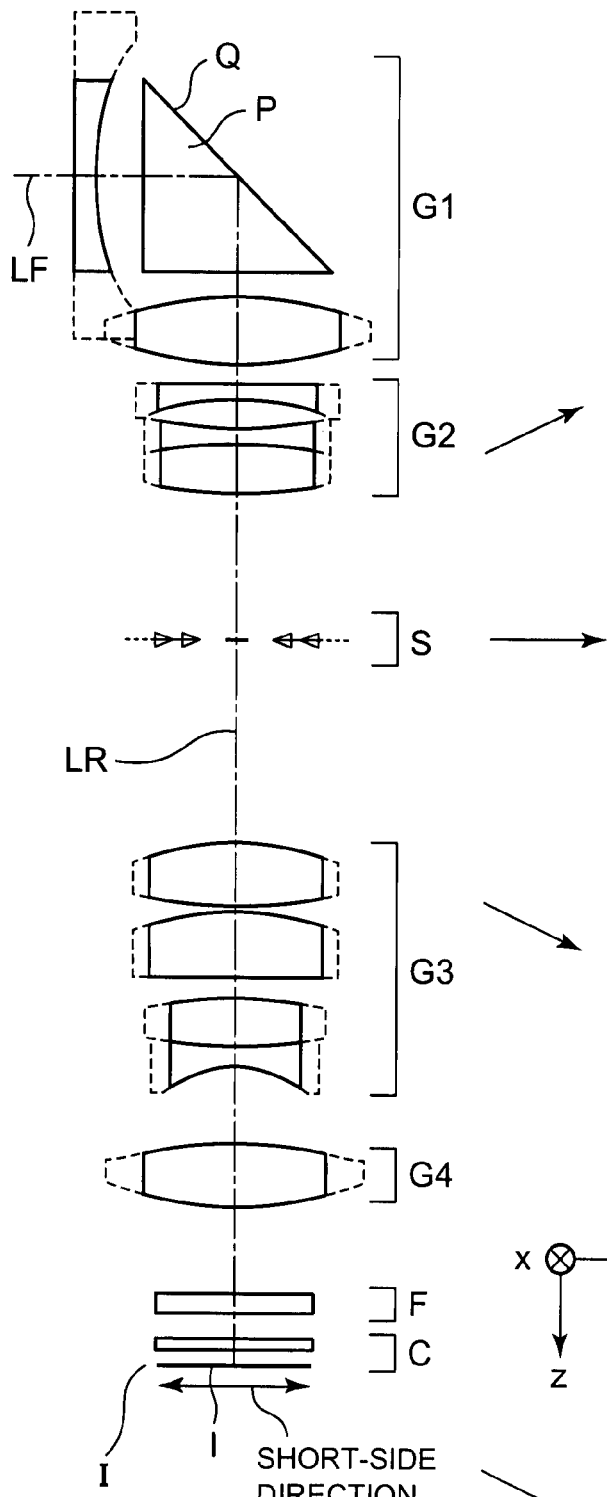
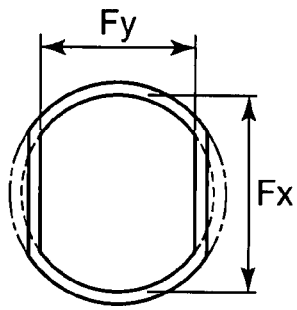
FIG. 3B
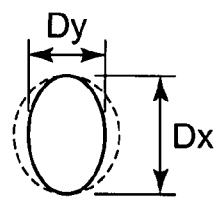
FIG. 3C
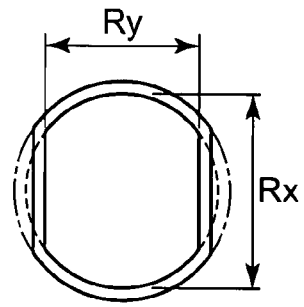
FIG. 3D
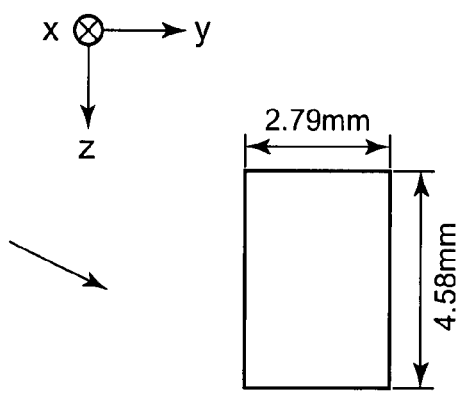
FIG. 3A
FIG. 3E

ELECTRONIC IMAGE PICKUP APPARATUS USING ZOOM LENS SYSTEM

CROSS REFERENCE TO RELATED APPLICATIONS

This application claims benefit under 35 U.S.C. §119 of Japanese patent application of No. 2006-276,137 filed in Japan on Oct. 10, 2006, the contents of which are incorporated herein by reference.

BACKGROUND OF THE INVENTION

1. Field of the Invention

The present invention relates to an electronic image pickup apparatus in which a zoom lens system having a reflective surface in an optical path is used.

2. Description of the Related Art

In recent years, instead of a silver halide film camera, a digital camera has been a mainstream which photographs an object by use of an electronic image pickup device such as a CCD image sensor or a CMOS type image sensor. Furthermore, the camera has a large number of categories in a broad range from a highly functional type for business to a compact popular type. In the present invention, the category of the compact popular type is especially noted.

A user of such a popular type of digital camera has a desire to enjoy photographing a broad range of scenes readily anytime and anywhere. Therefore, the user would like a digital camera which is conveniently carried with a good storage property in a clothing or bag pocket or the like and which has a small size in a thickness direction.

With regard to the size of the camera in the thickness direction, much weight is laid on a size of a lens barrel. Therefore, it is important to design a zoom lens system in consideration of thinning of the lens barrel.

There are several means for thinning the lens barrel, and one of the means is a zoom lens system in which an optical path is reflected by a reflective member such as a mirror or a prism disposed on the optical path to achieve the thinning. This zoom lens system has a characteristic that a shape of the camera hardly changes during the photographing and during the carrying. The system also has various merits including design, robustness, applications of dust-proof construction or drip-proof construction, but to achieve the thinning is the largest merit. To further improve this merit, a measure of cutting a part of a lens in the thickness direction of the camera is employed. In Japanese Patent Application Laid-Open No. 2005-121,799, an example in which a part of the lens is cut in the thickness direction of the camera is disclosed.

However, in a case where such cutting of the lens is performed, a room between a ray (an effective ray) which reaches an effective region of an image pickup surface and an outer diameter of the lens is much reduced. Therefore, stray light strikes on a cut portion of the lens, is reflected or irregularly reflected, and easily reaches the effective region of the image pickup surface. So-called ghost or flare is generated.

When intensity of the ghost or flare is low as compared with brightness of an object image, the ghost or flare does not raise any problem in many cases. However, in another case, the user rarely accepts the ghost or flare favorably.

BRIEF SUMMARY OF THE INVENTION

The present invention is directed to an electronic image pickup apparatus comprising: a zoom lens system which forms an image of an object; and an electronic image pickup device which receives the image formed by the zoom lens system to convert the image into an electric signal.

The zoom lens system comprises a plurality of lens units arranged along an optical path including an optical axis which extends from an object side to an image surface, and each space between the lens units which are adjacent to each other is changed to change a focal length of the zoom lens system. Moreover, among the plurality of lens units, a first lens unit which is a lens unit arranged closest to the object side includes a reflective surface which reflects the optical path, and an aperture stop having an aperture is disposed on the optical path extending from the reflective surface to the image surface.

The aperture of the aperture stop has a non-circular shape in a state in which an area of the aperture is maximized.

In the state in which the area of the aperture is maximized, a length of the aperture in a direction along an incident optical axis that enters the first lens unit is smaller than a length of the aperture in a direction vertical to the incident optical axis that enters the first lens unit and a reflected optical axis reflected by the reflective surface.

Furthermore, a lens arranged closest to an image side on the optical path extending from the reflective surface to the image surface has a non-circular outer shape. The outer shape of the lens is formed so that a length of the outer shape in the direction along the incident optical axis which enters the first lens unit is smaller than the length of the outer shape in the direction vertical to the incident optical axis which enters the first lens unit and the reflected optical axis reflected by the reflective surface.

In addition, the zoom lens system satisfies the following condition:

$$1.10 < D_x/D_y < 1.75 \qquad (1),$$

in which $D_y$ is a length of the aperture in the direction along the incident optical axis that enters the first lens unit in the state where the area of the aperture is maximized, and $D_x$ is a length of the aperture in the direction vertical to the incident optical axis that enters the first lens unit and the reflected optical axis reflected by the reflective surface of the first lens unit in the state where the area of the aperture is maximized.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view in a wide-angle end, FIG. 1B is a sectional view in a second intermediate position, and FIG. 1C is a sectional view in a telephoto end;

FIG. 2A is a diagram of a spherical aberration (SA), an astigmatism (FC), a distortion (DT) and a chromatic aberration (CC) of magnification in the wide-angle end, FIG. 2B is a diagram of the aberrations in a second intermediate position, and FIG. 2C is a diagram of the aberrations in the telephoto end;

FIGS. 3A to 3E are diagrams showing actual optical path shape and outer shape of the zoom lens system, FIG. 3A is a sectional view cut along a plane including the incident optical axis and the reflected optical axis, FIG. 3B is a diagram schematically showing an outer shape and a shape of a clear aperture of a lens arranged immediately before an aperture stop on an object side and, FIG. 3C is a diagram showing the shape of the aperture of the aperture stop, FIG. 3D is a diagram schematically showing an outer shape and a shape of a clear aperture of a lens arranged immediately after the aperture stop on an image side, and FIG. 3E is a diagram showing a shape of an effective image pickup region of an image pickup device;

FIG. 11A is a diagram showing a position of the fourth lens unit when focused at infinity (state A), FIG. 11B is a diagram showing a position of the fourth lens unit when focused at a short distance (state B), FIG. 11C is a diagram showing a position of the fourth lens unit when focused at a distance shorter than that of the state B (state C);

FIG. 13A shows a distribution of the signal output intensity in the state A of the photographing optical system, FIG. 13B shows a distribution of the signal output intensity in the state B, and FIG. 13C shows a distribution of the signal output intensity in the state C.

DETAILED DESCRIPTION OF THE PREFERRED EMBODIMENTS

Figure 1A:
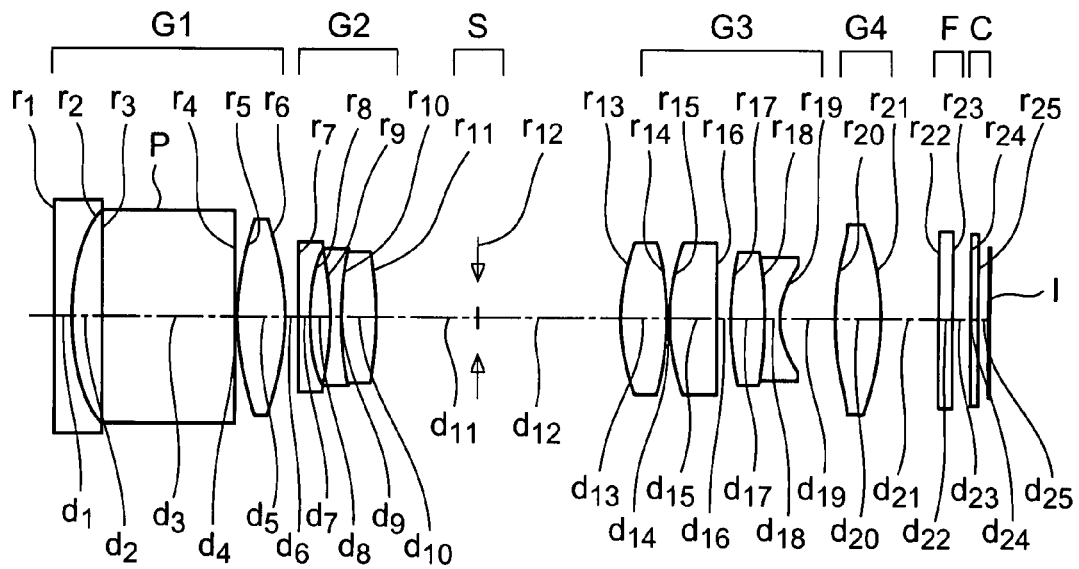
FIGS. 1A to 1C are sectional views of one example of a zoom lens system for use in an electronic image pickup apparatus according to the present invention when focused at infinity, showing a state in which an incident optical axis and a reflected optical axis are linearly extended.

FIGS. 3A to 3E are diagrams showing one example of a zoom lens system which can be used in the present invention, FIG. 3A is a sectional view of the zoom lens system cut along a plane including an incident optical axis and a reflected optical axis, FIG. 3B is a diagram schematically showing an outer shape and a shape of a clear aperture of a lens arranged immediately before an aperture stop on an object side, FIG. 3C is a diagram showing a shape of an aperture of the aperture stop, FIG. 3D is a diagram schematically showing an outer shape and a shape of a clear aperture of a lens arranged immediately after the aperture stop on an image side, and FIG. 3E is a diagram showing a shape of an effective image pickup region of an image pickup device.

As shown in FIG. 3A, this zoom lens system includes four lens units G1 to G4, and has a prism P having a reflective surface Q which reflects the optical axis in the first lens unit G1 positioned closest to the object side. Therefore, when this zoom lens system is used, a thickness of an electronic image pickup apparatus can be reduced.

Moreover, in many cases, a thickness of a lens barrel is determined by an outer diameter of the lens unit positioned away from an aperture stop among lenses following this reflective surface. Therefore, an outer shape of the lens arranged closest to the image side on the optical axis extending from the reflective surface Q to an image surface I is formed to be non-circular. More specifically, opposite sides of, for example, a circular lens are cut to form an oval shape. As a result, a length of the outer shape of the lens in a direction along an incident optical axis LF which enters the first lens unit is smaller than that of the outer shape in a direction vertical to the incident optical axis LF and a reflected optical axis LR reflected by the reflective surface Q. The outer shape of the lens is not limited to the oval shape, and various shapes such as an elliptic shape and an oblong shape can be employed. When the outer shape of the lens is formed in this manner, a size of the lens in a thickness direction (a y-axis direction) of the image pickup apparatus is reduced. Therefore, the image pickup apparatus can be thinned. FIG. 3D illustrates an outer shape of a lens immediately after the aperture stop on an image side. An outer shape of a lens (a positive lens of the fourth lens unit G4 in this example) arranged closest to the image side is similarly formed.

When the lens is formed into such a shape, the thickness of the image pickup apparatus can be reduced, but stray light strikes on a portion of the lens having a reduced size, and there is a high possibility that ghost or flare is generated.

To reduce the generation of the stray light, in this zoom lens system, the aperture of the aperture stop is formed so that, in a state in which an area of the aperture is maximized, a length of the aperture in a direction (the y-axis direction) along the incident optical axis LF which enters the first lens unit is smaller than that of the aperture in a direction (an x-axis direction) vertical to the incident optical axis LF which enters the first lens unit and the reflected optical axis LR reflected by the reflective surface. In an example of FIG. 3C, the aperture of the aperture stop has an elliptic shape, but other various shapes may be adopted. In a case where the shape of the aperture is determined in this manner, a shape of a light flux which enters a lens formed into a non-circular shape becomes non-circular, and generation of the stray light in a direction in which the size of the lens is reduced is easily suppressed. Incidentally, a drop of a light quantity of a peripheral portion of the image surface due to vignetting of the light flux is easily suppressed, and a difference of an image quality between the center of the image surface and the peripheral portion is easily reduced.

It is preferable to determine the shape of the aperture of the aperture stop so as to satisfy the following condition:

$$1.10 < D_x/D_y < 1.75 \qquad (1),$$

in which $D_y$ is the length of the aperture in the direction along the incident optical axis that enters the first lens unit in the state where the area of the aperture is maximized, and $D_x$ is the length of the aperture in the direction vertical to the incident optical axis that enters the first lens unit and the reflected optical axis reflected by the reflective surface of the first lens unit in the state where the area of the aperture is maximized.

The condition (1) specifically determines a degree of deviation of the aperture from a circular shape at a time when the aperture stop is fully opened, that is, a time when the area of the aperture is maximized. When the image pickup apparatus is thinned, a short-side direction of the non-circular lens is disposed in the thickness direction of the image pickup apparatus. Therefore, $D_y$ influences a dimension of the image pickup apparatus in the thickness direction.

If $D_x/D_y$ is below a lower limit of the condition (1), an effect of preventing the ghost or flare is reduced.

On the other hand, if $D_x/D_y$ is above an upper limit of the condition (1), the shape of the aperture stop largely deviates from the circular shape, and an accompanying problem is easily generated. For example, the light quantity of the whole image surface easily drops. Since blur of a point image reflects the aperture shape of the aperture stop, it is usually preferable that the aperture stop has a circular shape. If $D_x/D_y$ exceeds the upper limit, the image unnaturally blurs.

To miniaturize the lens barrel and the electronic image pickup apparatus, it is preferable that the aperture of the aperture stop has a constant area.

In a zoom lens system in which the optical axis is not reflected, it is easily to secure, around the aperture stop, a space where a mechanism for varying the area of the aperture of the aperture stop is disposed.

However, in a zoom lens system in which the optical axis is reflected, when the mechanism to change the area of the aperture is disposed around the aperture stop, the lens barrel thickens. Therefore, in order to thin the electronic image pickup device, it is preferable to omit a mechanism which regulates the area of the aperture.

In a case where the area of the aperture of the aperture stop is variable, the following constitution is preferable. That is, it is preferable that the area of the aperture of the aperture stop in a state in which the F-number is minimized in a wide-angle end is smaller than that in a state in which the F-number is minimized in a telephoto end. It is also preferable that the shape of the aperture satisfies the following condition in the state in which the F-number is minimized in the wide-angle end:

$$1.10 < D_{xW}/D_{yW} < 1.75 \qquad (2),$$

in which $D_{yW}$ is a length of the aperture in the direction along the incident optical axis that enters the first lens unit in a state where the area of the aperture is maximized in the wide-angle end, and $D_{xW}$ is a length of the aperture in the direction vertical to the incident optical axis that enters the first lens unit and the reflected optical axis reflected by the reflective surface of the first lens unit in the state in which the area of the aperture is maximized in the wide-angle end.

Usually in the zoom lens system, the influence of the stray light becomes more conspicuous closer to the wide-angle end. For example, when sunlight is positioned in the vicinity of the outside of an angle of photographing view, the light enters the zoom lens system, and the stray light cannot be reduced with a simple flare stop in some case. Therefore, the area of the aperture of the stop is reduced to suppress the generation of the stray light in the wide-angle end. On the other hand, the area of the aperture of the stop is enlarged to easily inhibit the F-number from being excessively increased (darkened) in the telephoto end.

Moreover, when the maximum area of the aperture in the wide-angle end is reduced, an influence of a coma is easily suppressed. Furthermore, it is more preferable that the aperture is formed into such a non-circular shape as to satisfy the condition (2) even in the wide-angle end, so that brightness is secured and the influence of the stray light is suppressed.

In a case where the area of the aperture of the aperture stop is variable, it is preferable to satisfy the following condition in a state in which the area of the aperture is minimized:

$$D_x/D_y > D_{xm}/D_{ym} \geq 0.5 \qquad (3),$$

in which $D_{ym}$ is a length of the aperture in the direction along the incident optical axis that enters the first lens unit in the state where the area of the aperture is minimized, and $D_{xm}$ is a length of the aperture in the direction vertical to the incident optical axis that enters the first lens unit and the reflected optical axis reflected by the reflective surface of the first lens unit in the state where the area of the aperture is minimized.

In a case where the area of the aperture is reduced while maintaining a degree of non-circularity of the shape of the aperture, an influence of diffraction increases in a state in which the aperture is narrowed down, and resolution easily drops. In order to easily reduce the influence of the diffraction in the state in which the aperture is narrowed down, it is preferable to satisfy the above condition (3).

If $D_{xm}/D_{ym}$ exceeds an upper limit of the condition (3), the influence of the diffraction easily increases in the state in which the aperture is narrowed down.

If $D_{xm}/D_{ym}$ is below a lower limit of the condition (3), an adverse influence (the influence of the diffraction, the unnaturalness of the blur) is easily generated due to large departure of the shape of the aperture from the circular shape.

It is to be noted that it is preferable to dispose the mechanism which changes the area of the aperture in the zoom lens system.

As the mechanism which changes the area of the aperture, an auxiliary aperture stop may be used which is movable in a direction that the length of the aperture is relatively larger and the shape of the aperture of which is fixed.

In this constitution, the auxiliary aperture stop moves in a direction substantially vertical to the thickness direction of the lens barrel. Therefore, even if a retreat space of the auxiliary aperture stop is secured, the thickness of the image pickup apparatus is easily reduced.

Moreover, as the mechanism which changes the area of the aperture, two aperture stop blades movable in a direction in which the length of the aperture is large may be used.

In this constitution, the aperture stop blades move in the direction substantially vertical to the thickness direction of the lens barrel. Therefore, even if the retreat space of the aperture stop blades is secured, the thickness of the electronic image pickup apparatus is easily reduced.

It is preferable to constitute lenses before and after the aperture stop as follows.

First, it is preferable that the clear aperture of a lens surface closest to the aperture stop on the object side from the aperture stop satisfies the following condition:

$$1.15 < F_x/F_y < 1.80 \qquad (4),$$

in which $F_y$ is a length of the clear aperture of the lens surface closest to the aperture stop on the object side from the aperture stop in the direction along the incident optical axis that enters the first lens unit, and $F_x$ is a length of the clear aperture of the lens surface closest to the aperture stop on the object side from the aperture stop along the direction vertical to the incident optical axis that enters the first lens unit and the reflected optical axis reflected by the reflective surface of the first lens unit.

The condition (4) indicates a ratio between a size of the clear aperture of the lens surface closest to the aperture stop in a long-side direction and a length of the clear aperture in a short-side direction among the lenses arranged on the object side from the aperture stop.

In a case where the aperture of the aperture stop satisfies the condition (1), the clear aperture of the lens surface is formed into such a shape as to satisfy the condition (4), which is preferable in thinning the image pickup apparatus and realizing the zoom lens system having less ghost or flare.

Moreover, it is preferable that the clear aperture of a lens surface closest to the aperture stop on the image side from the aperture stop satisfies the following condition:

$$1.15 < R_x/R_y < 1.80 \tag{5},$$

in which $R_y$ is a length of the clear aperture of the lens surface closest to the aperture stop on the image side from the aperture stop in the direction along the incident optical axis that enters the first lens unit, and $R_x$ is a length of the clear aperture of the lens surface closest to the aperture stop on the image side from the aperture stop in the direction vertical to the incident optical axis that enters the first lens unit and the reflected optical axis reflected by the reflective surface of the first lens unit.

The condition (5) indicates a ratio between a length of the clear aperture of the lens surface closest to the aperture stop in the long-side direction and a length of the clear aperture in the short-side direction among the lenses arranged on the image side from the aperture stop.

In a case where the aperture of the aperture stop satisfies the condition (1), the clear aperture of the lens surface is formed into such a shape as to satisfy the condition (5), which is preferable in thinning the image pickup apparatus and realizing the zoom lens system having less ghost or flare.

It is to be noted that in a case where the clear aperture of the lens surface satisfies the condition (4), it is preferable to form an outer shape of the lens into the non-circular shape.

Specifically, it is preferable to form the outer shape of the lens closest to the aperture stop on the object side from the aperture stop so that the length of the outer shape in the direction along the incident optical axis which enters the first lens unit is smaller than that in the direction vertical to the incident optical axis which enters the first lens unit and the reflected optical axis reflected by the reflective surface of the first lens unit.

Moreover, in a case where the clear aperture of the lens surface satisfies the condition (5), it is preferable to form the outer shape of the lens into the non-circular shape.

Specifically, it is preferable to form the outer shape of the lens closest to the aperture stop on the image side from the aperture stop so that the length of the outer shape in the direction of the incident optical axis which enters the first lens unit is smaller than that of the outer shape in the direction vertical to the incident optical axis which enters the first lens unit and the reflected optical axis reflected by the reflective surface of the first lens unit.

A thick light flux which is not separated by each image height enters the lenses before and after the aperture stop. When the shape of the aperture stop is close to the circular shape and side portions of these lenses are cut, the stray light due to the reflection by these side portions is easily generated.

However, in a case where the aperture of the aperture stop is formed into the non-circular shape and lens surfaces arranged closest to the aperture stop before and after the aperture stop accordingly satisfy the condition (4) and/or the condition (5), even when one or both of the lenses immediately before and after the aperture stop is formed into the non-circular shape, the generation of the stray light can be reduced, and this is therefore advantageous for miniaturization.

It is preferable that in the electronic image pickup device for use in the electronic image pickup apparatus according to the present invention, an effective image pickup region of a light receiving surface has a rectangular shape having a short-side direction and a long-side direction. Moreover, the electronic image pickup device is arranged so that the long-side direction of the effective image pickup region is the direction vertical to the incident optical axis which enters the first lens unit and the reflected optical axis reflected by the reflective surface of the first lens unit. In this case, it is preferable that the electronic image pickup apparatus has a control section which detects focusing information based on a contrast of an image formed at the effective image pickup region of the electronic image pickup device in the long-side direction.

The above-mentioned constitution is advantageous for thinning, because the short-side direction of the electronic image pickup device is arranged in the thickness direction of the electronic image pickup apparatus. The influence of the diffraction is reduced and the contrast of the image increases in a direction along the image surface corresponding to a direction in which the length of the aperture of the aperture stop is large. Therefore, in a system in which the focusing information is detected based on the contrast of the effective image pickup region of the electronic image pickup device in the long-side direction, precision of focusing can be increased.

Moreover, it is preferable that the electronic image pickup device satisfies the following condition:

$$1.45 \,\mu m < P < 2.15 \,\mu m \tag{6},$$

in which P is an average value of pixel pitches in the effective image pickup region of the electronic image pickup device.

In a case where the pixel pitches are reduced below a lower limit of the condition (6), even when the F-number ($F_{NO}$) of the optical system is reduced, the light quantity which enters each pixel does not increase very much, a light receiving efficiency drops, and the resolution does not easily improve.

Moreover, if the pixel pitches increase in excess of an upper limit of the condition (6), the effective number of the pixels decreases, or the effective image pickup region of the image pickup device increases. Even in a range in which the condition (6) is satisfied, if $D_x/D_y$ exceeds the upper limit of the condition (1), the resolution of the effective image pickup region on the image pickup device in the short-side direction drops, and an unnatural image is formed.

Figure 1B:
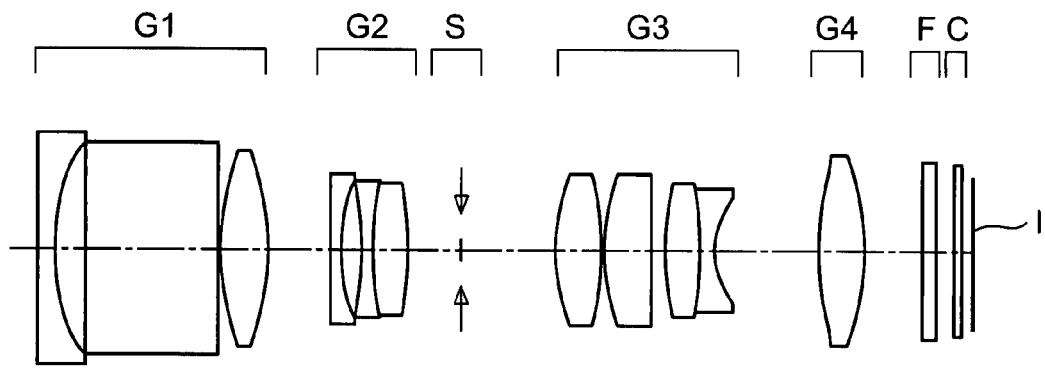
Figure 1C:
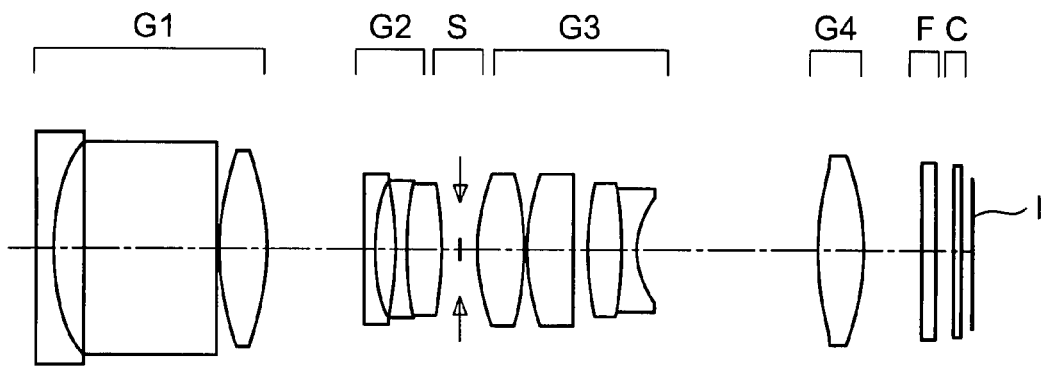

FIGS. 1A to 1C are diagrams showing a state in which an optical path of the prism P having the reflective surface Q included in the first lens unit G1 of the zoom lens system shown in FIG. 3A is linearly extended. FIGS. 1A to 1C are sectional views cut along a plane including the optical axis of the zoom lens system when focused at infinity, FIG. 1A is a sectional view showing the state in a wide-angle end, FIG. 1B is a sectional view in a second intermediate position, and FIG. 1C is a sectional view in a telephoto end. This zoom lens system includes, in order from the object side toward the image side, a first lens unit G1 having a positive refractive power, a second lens unit G2 having a negative refractive power, a third lens unit G3 having a positive refractive power and a fourth lens unit G4 having a positive refractive power. An aperture stop S is disposed between the second lens unit G2 and the third lens unit G3. During zooming from the wide-angle end to the telephoto end, the lens units move as follows:

That is, the first lens unit G1 is fixed, and the second lens unit G2 moves toward the image side, and changes a distance between the second lens unit and the first lens unit G1 to perform a zooming function. The aperture stop S does not move in an optical axis direction, and is fixed. The third lens unit G3 moves toward the object side, and shares the zooming function with the second lens unit G2. The fourth lens unit G4 once moves toward the object side, and then reverses a movement direction thereof to move toward the image-surface side, so that positional deviation of the image surface during the zooming is corrected. The focusing is performed by moving the fourth lens unit G4.

The first lens unit G1 includes, in order from the object side, a negative lens, a member P having a reflective surface and a positive lens, and reflects a light flux which has entered from the object side. The member P having the reflective surface is constituted as a right angle reflective prism which bends the optical path as much as 90° in this example. In FIGS. 1A to 1C, the right angle prism P is developed and shown as a parallel flat plate. It is to be noted that as shown in FIG. 3A, the incident optical axis LF which enters the zoom lens system in parallel with a y-axis from the object side is reflected as much as 90° by the reflective surface Q to form the reflected optical axis LR parallel to a z-axis.

A position of the reflective surface is not shown in lens data described later, but the surface is disposed right between an incidence surface and an emission surface of the right angle prism P. Along the optical path extending from the reflective surface to the image surface I, the lens units, the aperture stop and the like are arranged. The electronic image pickup device (a CCD image sensor, a CMOS type image sensor or the like) is arranged so that the light receiving surface substantially agrees with the image surface I.

The electronic image pickup device is arranged so that the light receiving surface of the device has a rectangular shape having a long-side direction and a short-side direction and the short-side direction is a thickness direction of an image pickup apparatus, that is, the same direction of the direction (a y-axis direction) of the incident optical axis LF which enters the first lens unit. On the other hand, the device is arranged so that the long-side direction is a direction vertical to a plane (a sheet surface of FIG. 3 which is a y-z plane in the drawing) including the incident optical axis LF and the reflected optical axis LR, that is, the same direction as an x-axis direction.

The aperture stop S is constituted so that an aperture size changes in accordance with a state of a focal length of the zoom lens system. Specifically, in a case where a state in which the F-number is minimized in the wide-angle end is compared with a state in which the F-number is minimized in the telephoto end, the aperture stop is constituted so as to reduce an aperture area in the wide-angle end and maximize the aperture area in the telephoto end.

The aperture of the aperture stop shown in FIG. 3C has an elliptic shape, the aperture stop is arranged so that a short-side direction (a short axis direction) of an ellipse is the y-axis direction and a long-side direction (a long axis direction) of the ellipse is the x-axis direction, and the aperture stop is constituted so as to satisfy the following:

$$D_x/D_y = 1.350.$$

Moreover, the aperture area of the aperture stop is reduced in the wide-angle end, the aperture area is changed so that a ratio between a size of the aperture stop in the short-side direction and a size of the aperture stop in the long-side direction is substantially constant, and the aperture stop is constituted so as to satisfy the following:

$$D_{xW}/D_{yW} = 1.350.$$

Therefore, generation of stray light in the wide-angle end is suppressed. On the other hand, in the telephoto end, the area of the aperture of the aperture stop is increased to prevent the F-number from being excessively enlarged (darkened).

The area of the aperture of the aperture stop S may continuously be changed using a large number of aperture stop blades, or aperture stop members provided with apertures having different aperture areas may be inserted into and removed from the optical path to change the area in multiple stages.

Figure 8:
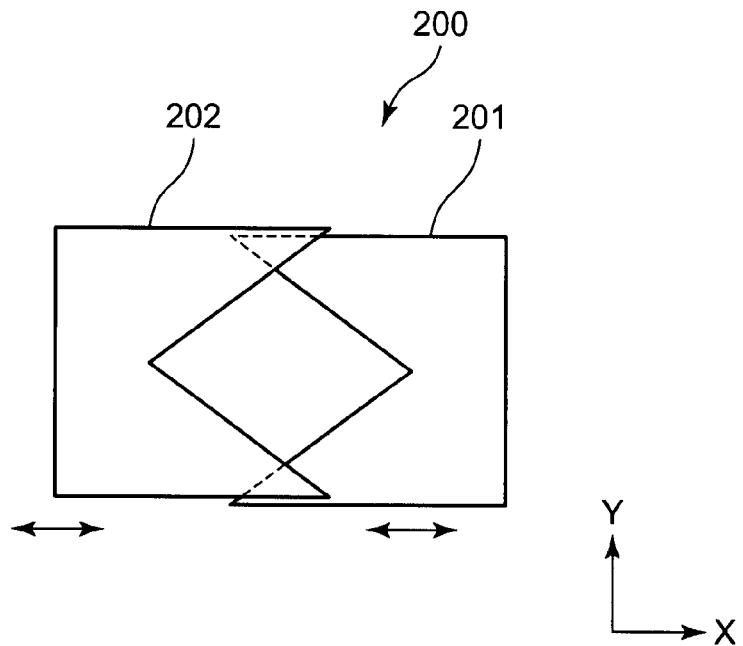
FIG. 8 is a diagram showing a schematic constitution of one example of an aperture stop.

The shape of the aperture of the aperture stop S is not limited to an elliptic shape, and may be, for example, a rhombic shape. In a case where the aperture is formed into the rhombic shape, as shown in, for example, FIG. 8, the rhombic aperture of an aperture stop 200 may include two aperture stop blades 201, 202 which move in the long-side direction (an X-axis direction) of the rhombic shape. When the aperture stop blades 201, 202 are moved to change the aperture area, a ratio between the size of the aperture in the short-side direction (a Y-axis direction) and the size of the aperture in the long-side direction (the X-axis direction) becomes constant. In this example, the aperture stop is constituted so as to satisfy the followings in a state in which the aperture is narrowed down most and minimized:

$$S_{12x} = 1.0;$$

$$S_{12y} = 1.0; \text{ and}$$

$$S_{12x}/S_{12y} = 1.0,$$

in which $S_{12x}$ is a half of the length of the aperture of the aperture stop in the X-axis direction and $S_{12y}$ is a half of the length of the aperture of the aperture stop in the Y-axis direction. That is, $D_{xm} = 2.0$, $D_{ym} = 2.0$ and $D_{xm}/D_{yb} = 1.0$.

Moreover, when a clear aperture shown in numerical data described later is secured, an outer shape of each lens is formed so that, as shown in FIGS. 3A, 3B and 3D, the negative lens of the first lens unit shortens in a z-axis direction, and the other lenses shorten in a y-axis direction. Since FIG. 3B shows the outer shape of a lens arranged immediately before the aperture stop on the object side, the outer shapes of the positive lens of the first lens unit G1 and the lenses of the second lens unit G2 are all similarly formed. Also, since FIG. 3D shows the outer shape of a lens arranged immediately before the aperture stop on the image side, the outer shapes of the lenses of the third lens unit G3 and the fourth lens unit G4 are all similarly formed, and the lenses shorten in the y-axis axis direction as compared with circular shapes shown in broken lines Next, a numerical example of the zoom lens system will be described.

As shown in FIGS. 1A to 1C, this zoom lens system includes, in order from the object side, the first lens unit G1 having a positive refractive power, the second lens unit G2 having a negative refractive power, the aperture stop S, the third lens unit G3 having a positive refractive power and the fourth lens unit G4 having a positive refractive power. A parallel flat plate constituting an optical low pass filter provided with a wavelength band restrictive coating which limits infrared light is denoted with F, a parallel flat plate of a cover glass of the electronic image pickup device is denoted with C, and the image surface is denoted with I. It is to be noted that the surface of the cover glass C may be provided with a multilayered thin film for limiting a wavelength band. The cover glass C may have a low pass filter function.

The first lens unit G1 includes, in order from the object side, a first double-concave negative lens, an optical path bending prism P having a reflective surface and a second double-convex positive lens. The second lens unit G2 includes, in order from the object side, a third negative meniscus lens whose convex surface faces the object side, a fourth double-concave negative lens, and a fifth double-convex positive lens. The fourth double-concave negative lens is cemented to the fifth double-convex positive lens. The third lens unit G3 includes, in order from the object side, a sixth double-convex positive lens, a seventh double-convex positive lens, an eighth double-convex positive lens and a ninth double-concave negative lens. The eighth double-convex positive lens is cemented to the ninth double-concave negative lens. The fourth lens unit G4 includes a tenth double-convex positive lens.

Aspherical surfaces are used in six surfaces including opposite surfaces of the second double-convex positive lens, opposite surfaces of the sixth double-convex positive lens and opposite surfaces of the tenth double-convex positive lens.

In the following numerical data, in addition to the above symbols, f is a focal length of the zoom lens system, $F_{NO}$ is the F-number, ω is a half angle of view, WE is a wide-angle end, ST1 is a first intermediate position, ST2 is a second intermediate position, ST3 is a third intermediate position, TE is a telephoto end, $r_1, r_2, \ldots$ are paraxial radii of curvature of the lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface, and (I) indicates that the surface is an image surface, respectively. It is to be noted that a shape of the aspherical surface is represented by the following equation in a coordinate system in which a light travel direction is regarded as a positive direction to align a z-axis with the optical axis, an intersection between the z-axis and the aspherical surface is an origin and a y-axis passes through the origin and crosses the optical axis at right angles. Here, the shape of the aspherical surface is rotationally symmetric with respect to the z-axis. Therefore, the x-axis crossing the z-axis and the y-axis at right angles can be represented by an equation similar to the following equation.

$$z=(y^2/r)/[1+\{1-(K+1)(y/r)^2\}^{1/2}]+A_4 y^4+A_6 y^6+A_8 y^8+A_{10}y^{10}+A_{12}y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. In the aspherical surface coefficient, "e-n" (n is an integer) indicates multiplication by "$10^{-n}$".

Moreover, $F_{NO.x}$ is the F-number in the X-axis direction, $F_{NO.y}$ is the F-number in the Y-axis direction, $ed_x$ is a half of the size of the clear aperture in the X-axis direction of each surface, $ed_y$ is a half of the size of the clear aperture in the Y-axis direction (a half of the size of the clear aperture in the Z-axis direction for the surface on the object side from the reflective surface) of each surface, $S_{12x}$ is a half of the size of the aperture of the aperture stop in the X-axis direction and $S_{12y}$ is a half of the size of the aperture of the aperture stop in the Y-axis direction, respectively.

TABLE 1

Lens Data

| | | | | | |
|---|---|---|---|---|---|
| $r_1 = -205.452$ | $d_1 = 0.80$ | $n_{d1} = 1.84666$ | $v_{d1} = 23.78$ | $ed_{1x} = 6.20$ | $ed_{1y} = 4.24$ |
| $r_2 = 10.665$ | $d_2 = 1.52$ | | | $ed_{2x} = 5.58$ | $ed_{2y} = 4.00$ |
| $r_3 = \infty$ | $d_3 = 7.40$ | $n_{d2} = 1.80610$ | $v_{d2} = 40.92$ | $ed_{3x} = 5.56$ | $ed_{3y} = 3.97$ |
| $r_4 = \infty$ | $d_4 = 0.20$ | | | $ed_{4x} = 5.22$ | $ed_{4y} = 4.53$ |
| $r_5 = 15.074$(AS) | $d_5 = 2.49$ | $n_{d3} = 1.76802$ | $v_{d3} = 49.24$ | $ed_{5x} = 5.14$ | $ed_{5y} = 4.66$ |
| $r_6 = -14.697$(AS) | $d_6 =$ variable | | | $ed_{6x} = 4.07$ | $ed_{6y} = 4.63$ |
| $r_7 = 153.510$ | $d_7 = 0.70$ | $n_{d4} = 1.88300$ | $v_{d4} = 40.76$ | $ed_{7x} = 3.73$ | $ed_{7y} = 3.29$ |
| $r_8 = 13.647$ | $d_8 = 1.15$ | | | $ed_{8x} = 3.60$ | $ed_{8y} = 3.10$ |
| $r_9 = -11.094$ | $d_9 = 0.70$ | $n_{d5} = 1.88300$ | $v_{d5} = 40.76$ | $ed_{9x} = 3.53$ | $ed_{9y} = 2.45$ |
| $r_{10} = 16.398$ | $d_{10} = 1.80$ | $n_{d6} = 1.92286$ | $v_{d6} = 20.88$ | $ed_{10x} = 4.00$ | $ed_{10y} = 2.45$ |
| $r_{11} = -32.399$ | $d_{11} =$ variable | | | $ed_{11x} = 4.00$ | $ed_{11y} = 2.45$ |
| $r_{12} = \infty$(S) | $d_{12} =$ variable | | | $ed_{12x} = s_{12x}$ | $ed_{12y} = s_{12y}$ |
| $r_{13} = 9.297$(AS) | $d_{13} = 2.43$ | $n_{d7} = 1.58913$ | $v_{d7} = 61.25$ | $ed_{13x} = 4.00$ | $ed_{13y} = 3.45$ |
| $r_{14} = -24.419$(AS) | $d_{14} = 0.20$ | | | $ed_{14x} = 4.00$ | $ed_{14y} = 3.45$ |
| $r_{15} = 9.855$ | $d_{15} = 2.60$ | $n_{d8} = 1.49700$ | $v_{d8} = 81.54$ | $ed_{15x} = 3.95$ | $ed_{15y} = 3.87$ |
| $r_{16} = -150.333$ | $d_{16} = 0.80$ | | | $ed_{16x} = 3.71$ | $ed_{16y} = 3.54$ |
| $r_{17} = 19.700$ | $d_{17} = 1.77$ | $n_{d9} = 1.60172$ | $v_{d9} = 60.60$ | $ed_{17x} = 3.50$ | $ed_{17y} = 3.26$ |
| $r_{18} = -32.398$ | $d_{18} = 0.80$ | $n_{d10} = 1.84666$ | $v_{d10} = 23.78$ | $ed_{18x} = 3.24$ | $ed_{18y} = 2.93$ |
| $r_{19} = 4.457$ | $d_{19} =$ variable | | | $ed_{19x} = 2.99$ | $ed_{19y} = 2.66$ |
| $r_{20} = 15.828$(AS) | $d_{20} = 2.49$ | $n_{d11} = 1.52500$ | $v_{d11} = 55.80$ | $ed_{20x} = 4.90$ | $ed_{20y} = 3.26$ |
| $r_{21} = -15.755$(AS) | $d_{21} =$ variable | | | $ed_{21x} = 5.02$ | $ed_{21y} = 3.28$ |
| $r_{22} = \infty$ | $d_{22} = 0.88$ | $n_{d12} = 1.54771$ | $v_{d12} = 62.84$ | $ed_{22x} = 4.73$ | $ed_{22y} = 2.98$ |
| $r_{23} = \infty$ | $d_{23} = 0.89$ | | | $ed_{23x} = 4.68$ | $ed_{23y} = 2.93$ |
| $r_{24} = \infty$ | $d_{24} = 0.50$ | $n_{d13} = 1.51633$ | $v_{d13} = 64.14$ | $ed_{24x} = 4.61$ | $ed_{24y} = 2.85$ |
| $r_{25} = \infty$ | $d_{25} = 0.60$ | | | $ed_{25x} = 4.60$ | $ed_{25y} = 2.83$ |
| $r_{26} = \infty$(I) | | | | $ed_{26x} = 4.58$ | $ed_{26y} = 2.79$ |

Aspherical Coefficient

5th surface r = 15.074
K = 0.000
$A_4 = -1.26135e-04$   $A_6 = 2.52905e-06$   $A_8 = -4.00946e-08$
$A_{10} = -1.87589e-09$ TABLE 1-continued 6th surface r = −14.697
K = 0.000
$A_4$ = −4.93971e−06      $A_6$ = 3.84372e−06      $A_8$ = −1.00573e−07
$A_{10}$ = −6.58744e−10

13th surface r = 9.297
K = 0.000
$A_4$ = −2.02391e−04      $A_6$ = −4.63863e−07      $A_8$ = −2.67686e−08
$A_{10}$ = −1.07522e−08

14th surface r = −24.419
K = 0.000
$A_4$ = 1.06475e−04       $A_6$ = 2.61409e−06       $A_8$ = −3.62177e−07

20th surface r = 15.828
K = 0.000
$A_4$ = 4.10682e−04       $A_6$ = −2.65177e−05      $A_8$ = 1.17779e−06
$A_{10}$ = −3.98281e−08

21st surface r = −15.755
K = 0.000
$A_4$ = 3.52819e−04       $A_6$ = −1.96304e−05      $A_8$ = 7.23922e−07
$A_{10}$ = −3.11244e−08

TABLE 2

Zoom Data (∞)

|  | WE | ST1 | ST2 | ST3 | TE |
|---|---|---|---|---|---|
| f (mm) | 6.81 | 8.90 | 11.53 | 15.10 | 19.65 |
| $F_{NO.x}$ | 3.57 | 3.99 | 4.00 | 4.70 | 5.10 |
| $F_{NO.y}$ | 4.81 | 5.37 | 5.39 | 6.34 | 6.87 |
| 2ω (°) | 61.19 | 46.43 | 35.86 | 27.81 | 21.70 |
| d6 | 0.60 | 1.99 | 3.50 | 4.44 | 5.26 |
| d11 | 5.56 | 4.17 | 2.66 | 1.72 | 0.90 |
| d12 | 7.85 | 6.37 | 5.28 | 3.26 | 1.10 |
| d19 | 3.00 | 4.45 | 5.69 | 7.77 | 9.96 |
| d21 | 3.21 | 3.24 | 3.09 | 3.03 | 3.00 |
| $S_{12x}$ | 1.957 | 1.984 | 2.175 | 2.184 | 2.391 |
| $S_{12y}$ | 1.450 | 1.470 | 1.612 | 1.618 | 1.771 |
| $S_{12x}/S_{12y}$ | 1.350 | 1.350 | 1.349 | 1.350 | 1.350 |

Figure 2A:
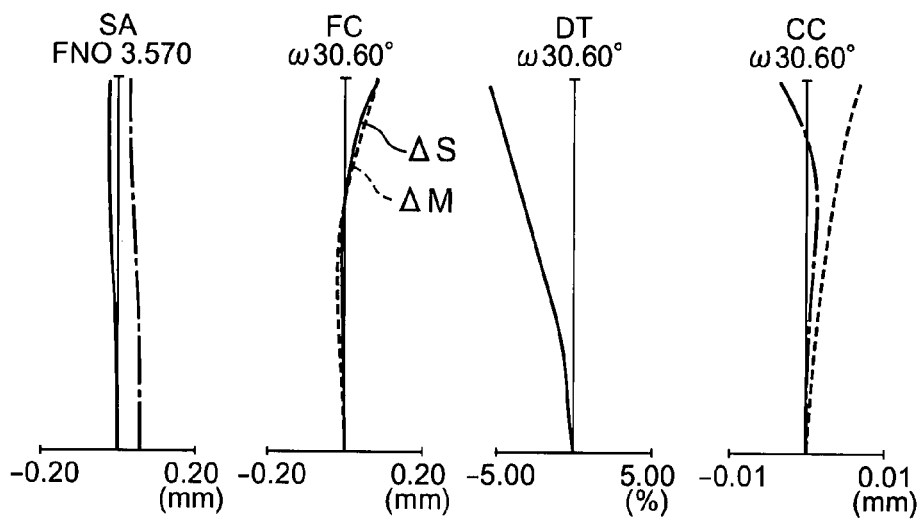
FIGS. 2A to 2C are aberration diagrams of the zoom lens system when focused at infinity.
Figure 2B:
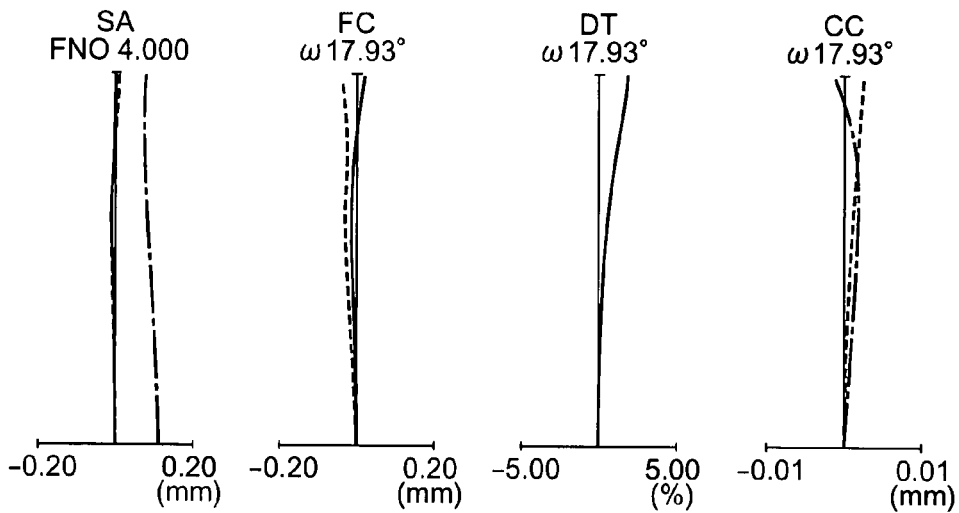
Figure 2C:
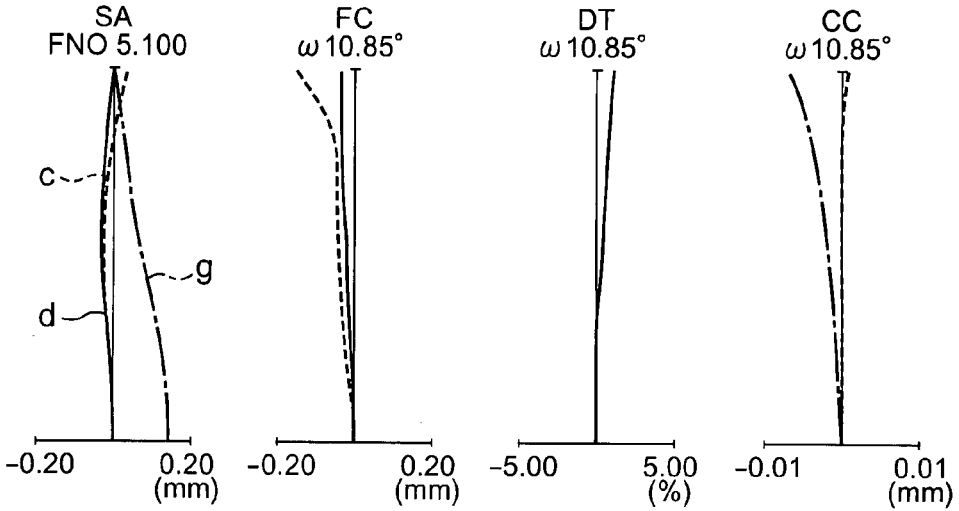

FIGS. 2A to 2C are aberration diagrams of the above-mentioned numerical example of the zoom lens system when focused at infinity, FIG. 2A shows a spherical aberration (SA), an astigmatism (FC), a distortion (DT) and a chromatic aberration (CC) of magnification in the wide-angle end, FIG. 2B shows the aberrations in the second intermediate position, and FIG. 2C is a diagram showing the aberrations in the telephoto end. In the drawings, ω is a half angle of view.

FIG. 3A shows a sectional view of the zoom lens system cut along a Y-Z section. With regard to an aspect ratio of the effective image pickup region of the light receiving surface of the image pickup device, the region has a transversely long rectangular shape having a long side with a length of 4.58 mm and a short side with a length of 2.79 mm. The optical axis is reflected by the prism or the like so that the reflected optical axis is directed in an upward or downward direction of the image pickup apparatus, that is, the zoom lens system is arranged so that the short-side direction of the effective image pickup region of the image pickup device is the thickness direction of the image pickup apparatus. In this case, the image pickup apparatus has the most advantageous layout that reduces the size of the apparatus in the thickness direction. This example has such a layout. It is to be noted that the effective image pickup region is a region of the light receiving surface of the image pickup device for use in printing and displaying of the image.

In a case where each lens has a circular shape as viewed in an optical axis direction, when the effective surface of each lens is secured, a shape as shown by a broken line in FIG. 3A is obtained. However, the lens has a shape as if the lens were cut in the thickness direction (the Y-axis direction) of the image pickup apparatus, and a shape shown by a solid line is therefore obtained.

The size of the aperture of the aperture stop is similarly reduced in the thickness direction (the Y-axis direction) of the camera, and there is a restriction on a ray which strikes on the lens on the image side of the aperture stop.

For both the outer shape of the lens and the shape of the aperture of the aperture stop, the shapes shown by dotted lines are both shapes in a case where the lens is formed into the circular shape in accordance with the above-mentioned numerical data $ed_x$. A solid lines show the shapes in a case where the lens is thinned in consideration of the data $ed_y$.

Moreover, FIGS. 3B, 3C and 3D show schematic constitutions of the aperture of the aperture stop and the clear apertures of the lens surfaces immediately before and after the aperture stop as viewed from the aperture stop. It is to be noted that a correct shape is obtained in accordance with the above-mentioned numerical data.

In the present example, the sizes of the clear aperture of the lens surface immediately before the aperture stop in the X-axis direction and the Y-axis direction are denoted with $F_x$, $F_y$, and the sizes of the clear aperture of the lens surface immediately after the aperture stop are denoted with $R_x$, $R_y$.

When the lens is cut in consideration of the size of this effective surface, the lens can be miniaturized. The outer shape of the lens does not have to be formed by linearly cutting a part of the lens, and may be any shape such as an elliptic shape as long as the size of the camera in a depth direction is reduced.

Similarly, in the present example, the aperture of the aperture stop has an elliptic shape, but may have any shape such as a rhombic shape as long as the condition (1) is satisfied. In the present example, the optical axis is disposed at the center of the aperture of the aperture stop and the center of the lens, but the axis may deviate from the center.

Furthermore, pixel pitches of the image pickup device in the short-side direction and the long-side direction are both set to 1.7 μm (P=1.7 μm).

Values corresponding to the conditions of the present example are as follows:

$$D_x/D_y \ldots 1.350; \quad (1)$$

$$D_{xW}/D_{yW} \ldots 1.350; \quad (2)$$

$$D_{xm}/D_{ym} \ldots 1.0; \quad (3)$$

$$F_x/F_y \ldots 1.63; \quad (4)$$

$$R_x/R_y \ldots 1.16; \text{ and} \quad (5)$$

$$P \ldots 1.7 \text{ μm}. \quad (6)$$

Moreover, in the present example, the fourth lens unit G4 is moved in the optical axis direction, and the contrast of the effective image pickup region of the image pickup device in the long-side direction is detected. A position of the fourth lens unit G4 is changed to measure contrasts of a plurality of positions, and a state in which the contrast becomes the highest is regarded as a focused state. The fourth fourth lens unit G4 is moved to the position and fix the unit at the position.

The fourth lens unit G4 may be moved according to a result of calculation being performed to estimate an in-focus position from the contrasts in the plurality of states. Since the X-axis direction is a direction in which the size of the aperture of the aperture stop is large, the influence of the diffraction by the aperture stop is suppressed, and satisfactory focusing can be performed. Such focusing control is executed by a control section described later.

Next, the whole constitution of an electronic image pickup apparatus will be described. This embodiment is directed to a digital camera.

Figure 4:
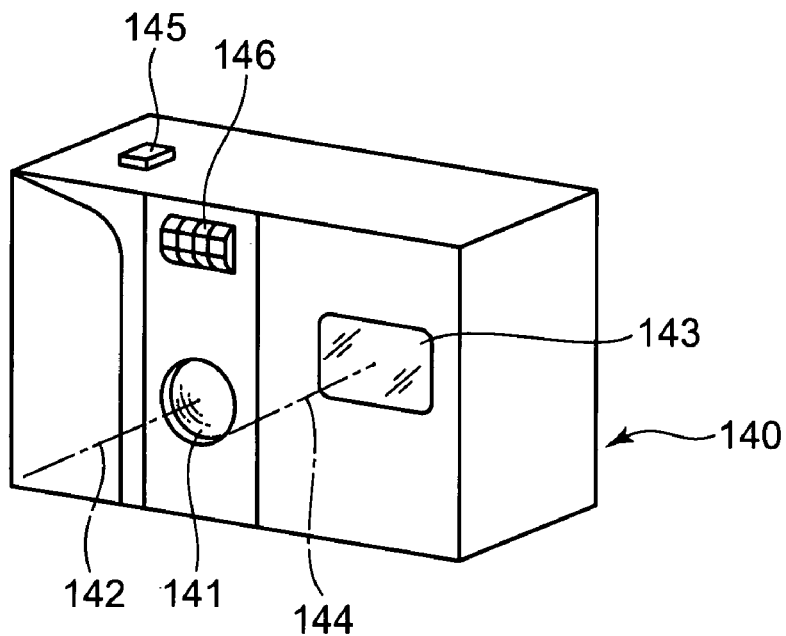
FIG. 4 is a front perspective view showing an appearance of an embodiment of a digital camera according to the present invention.
Figure 5:
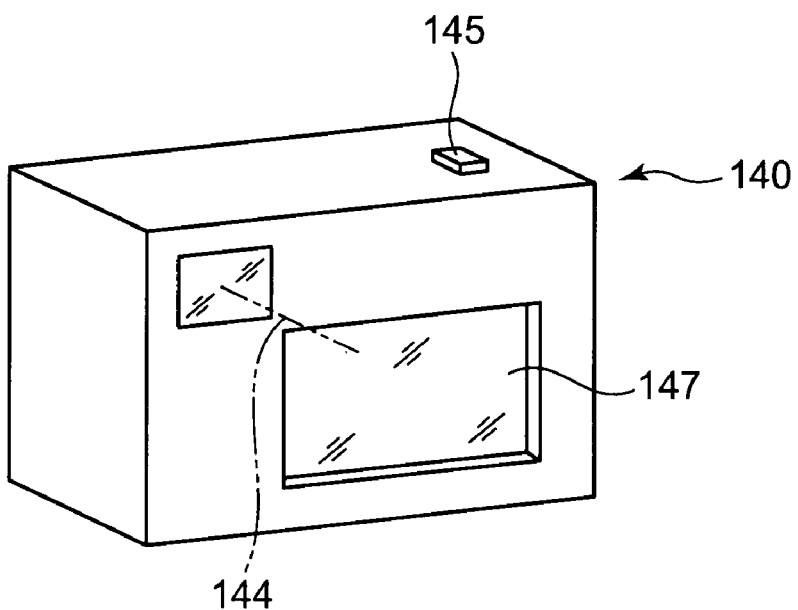
FIG. 5 is a rear perspective view of the digital camera of FIG. 4.
Figure 6:
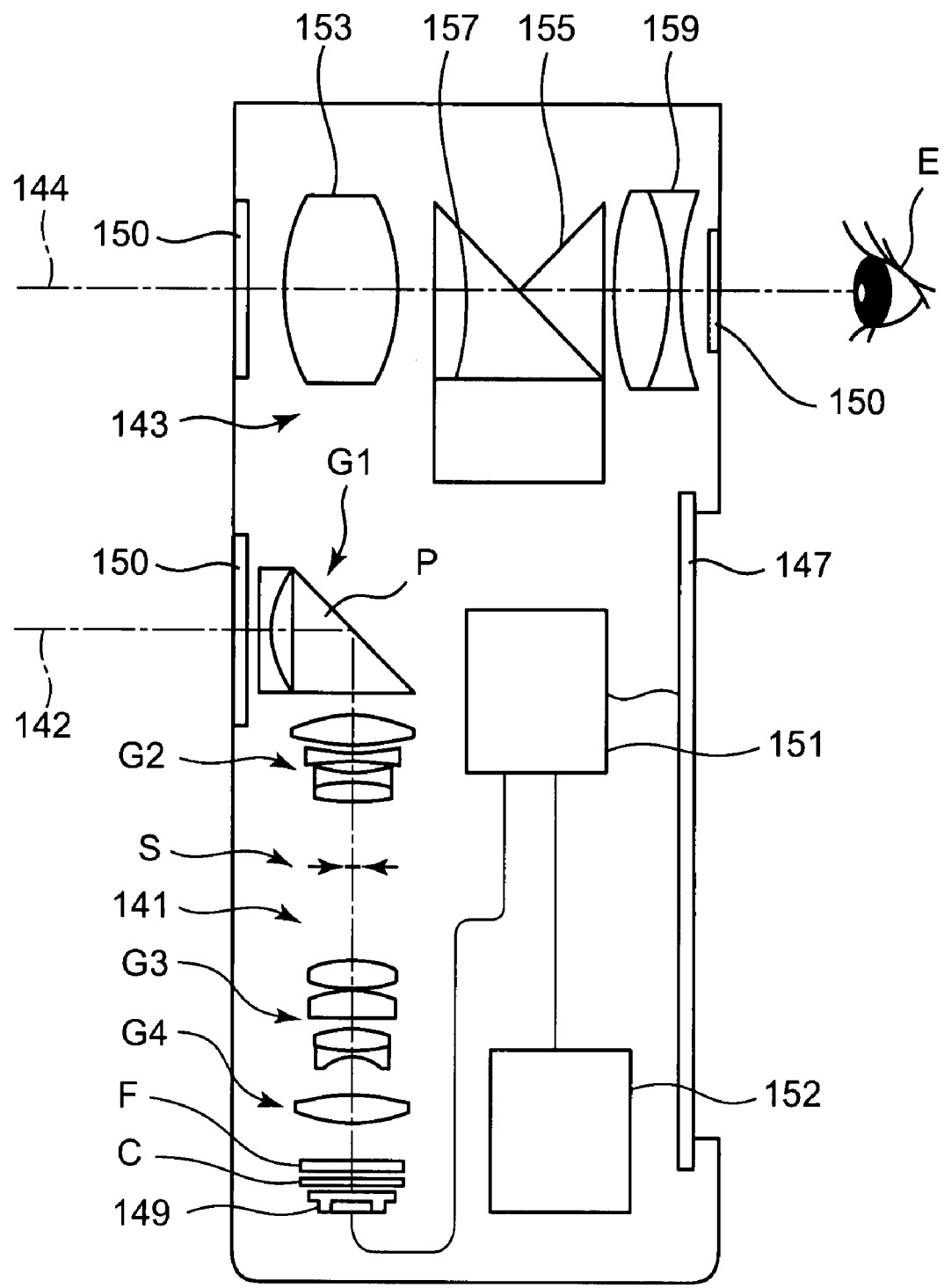
FIG. 6 is a schematic sectional view showing an inner constitution of the digital camera of FIG. 4.

FIGS. 4 is a front perspective view showing an appearance of a digital camera 140, FIG. 5 is a back perspective view of the camera, and FIG. 6 is a schematic sectional view showing a constitution of the digital camera 140. In this example, the digital camera 140 includes a photographing optical system 141 having an optical path 142 for photographing, a finder optical system 143 having an optical path 144 for a finder, a shutter release button 145, a flash lamp 146, a liquid crystal display monitor 147 and the like. When the shutter release button 145 disposed at an upper portion of the camera 140 is pressed, the photographing is performed through the photographing optical system 141 in response to the pressed button. An object image is formed by the photographing optical system 141 on an image pickup surface of a CCD image sensor 149 via a near infrared cutting filter and an optical low pass filter F. The object image received by this CCD image sensor 149 is displayed as an electronic image in the liquid crystal display monitor 147 provided at a back surface of the camera via processing means 151. The processing means 151 is connected to recording means 152, and the photographed electronic image can be recorded. It is to be noted that this recording means 152 may be integrated with the processing means 151, or the means may separately be arranged. As the recording means, a memory or a hard disk drive (HDD) incorporated in the digital camera may be used, or an HDD, a memory card, a DVD or the like detachably attached to the digital camera may be used.

Furthermore, an objective optical system 153 for the finder is disposed along the optical path 144 for the finder. The object image is formed by the objective optical system 153 for the finder on a view field frame 157 of a Porro-prism 155 as an image erecting member. Behind this Porro-prism 155, an eyepiece optical system 159 is disposed which guides an erected image into an observer's eyeball E. It is to be noted that cover members 150 are disposed on an incidence side of the photographing optical system 141 and the objective optical system 153 for the finder and an emission side of the eyepiece optical system 159.

As the photographing optical system 141, the zoom lens system shown in FIGS. 1A to 1C or 3A is used.

In the digital camera 140 constituted in this manner, the photographing optical system 141 is bent by the prism P, and a size of the camera in the thickness direction is reduced. In addition, outer shapes of lenses on an image side from the prism P are formed to be small in the thickness direction of the camera. Therefore, the digital camera which is remarkably thin in the depth direction can be realized.

It is to be noted that in an example of FIG. 6, parallel flat plates are arranged as the cover members 150, but lenses having powers may be used. Alternatively, the cover members 150 may be omitted.

Figure 7:
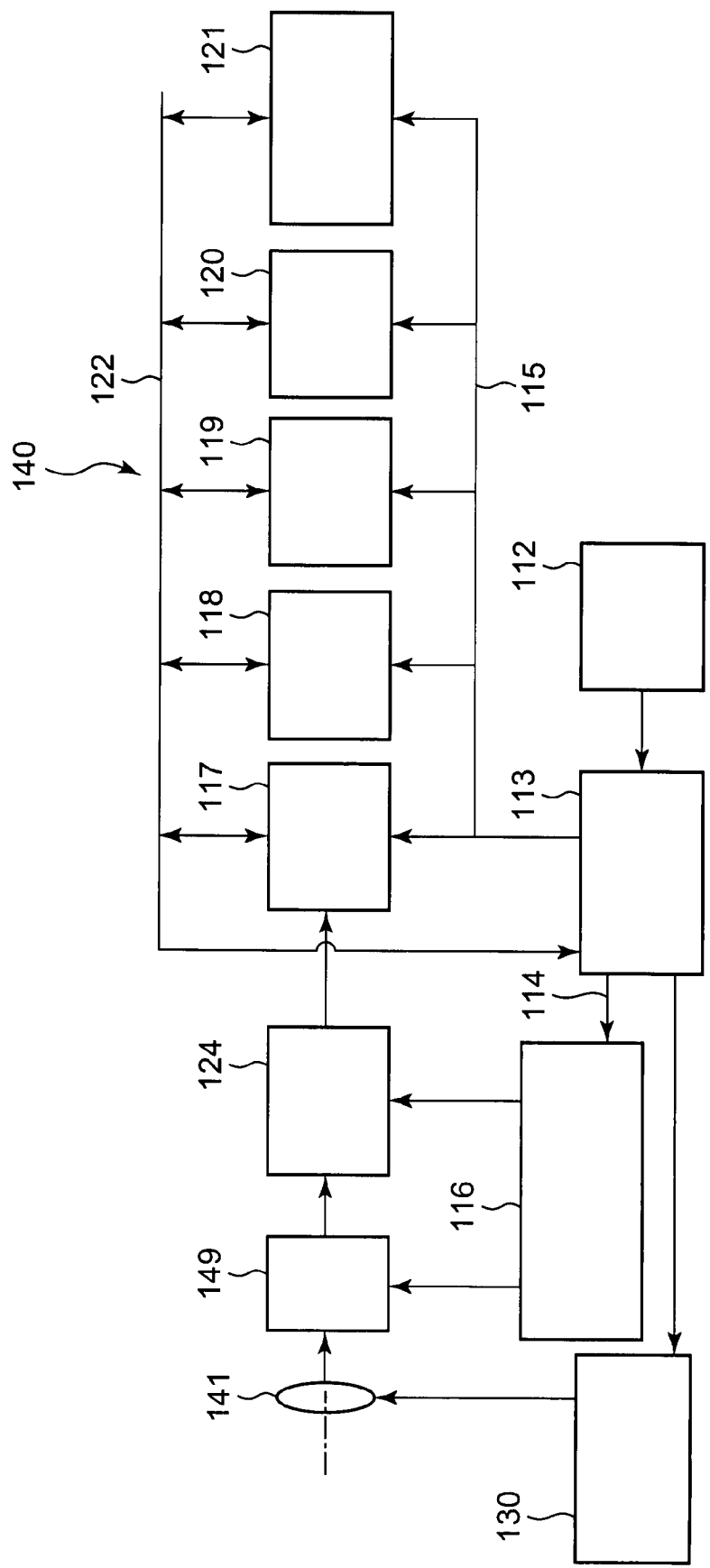
FIG. 7 is a block diagram showing a main part of an inner circuit of the digital camera shown in FIG. 4.

FIG. 7 is a block diagram showing a constitution of a main part of an internal circuit of the digital camera 140. It is to be noted that in the following description, the processing means includes, for example, a CDS/ADC section 124, a temporary storage memory 117, an image processing section 118 and the like, and recording means includes a storage medium section 119 and the like.

As shown in FIG. 7, the digital camera 140 includes an operating section 112, a control section 113 connected to this operating section 112, and an image pickup driving circuit 116, the temporary storage memory 117, the image processing section 118, the storage medium section 119, a display section 120 and a setting information storage memory section 121 which are connected to a control signal output port of the control section 113 via buses 114 and 115.

Moreover, this control section is electrically connected to a zoom lens driving circuit 130 which controls zoom lenses, transmits information to the driving circuit, and also controls a zooming operation, an operation of an aperture stop shape, and a focusing operation in cooperation with a CCD image sensor.

The temporary storage memory 117, the image processing section 118, the storage medium section 119, the display section 120 and the setting information storage memory section 121 are constituted so that they can input or output data with respect to one another via a bus 122. The image pickup driving circuit 116 is connected to the CCD image sensor 149 and the CDS/ADC section 124.

The operating section 112 includes various input buttons and switches such as the shutter release button, and transmits, to the control section, event information input from the outside (a camera user) via these input buttons and switches.

The control section 113 includes, for example, a central processing unit (CPU), and is a circuit in which a program memory (not shown) is incorporated and which controls the whole digital camera 140 in response to an instruction command input from the camera user via the operating section 112 in accordance with a program stored in the program memory.

The CCD image sensor 149 receives the object image formed via the photographing optical system 141. The CCD image sensor 149 is an image pickup device which is driven and controlled by the image pickup driving circuit 116 and which converts, into an electric signal, a light quantity of the object image for each pixel to output the signal to the CDS/ADC section 124.

The CDS/ADC section 124 is a circuit which amplifies the electric signal output from the CCD image sensor 149 and which subjects the signal to analog/digital conversion to output, to the temporary storage memory 117, video bare data (hereinafter referred to as the raw data) simply subjected to the amplification and digital conversion.

The temporary storage memory 117 is a buffer including, for example, an SDRAM and the like, and is a memory device in which the raw data output from the CDS/ADC section 124 is temporarily stored. The image processing section 118 is a circuit which reads the raw data stored in the temporary storage memory 117 or the storage medium section 119 to subject the data to various electric image processing including distortion correction based on an image quality parameter designated by the control section 113.

The recording medium section 119 is a control circuit of, for example, an apparatus to which a card or stick type recording medium including a flash memory and the like is detachably attached and in which the raw data transferred from the temporary storage memory 117 and image data subjected to image processing by the image processing section 118 are recorded and retained in the card or stick type flash memory.

The display section 120 includes the liquid crystal display monitor 147, and a circuit to display an image, an operation menu and the like in the liquid crystal display monitor 147.

The setting information storage memory section 121 includes an ROM section in which various image quality parameters are stored beforehand, an RAM section to store the image quality parameter selected from the image quality parameters read from the ROM section by an input operation of the operating section 112, and a circuit which controls input/output with respect to these memories.

Here, a method of performing the focusing based on the contrast in the effective image pickup region in the long-side direction usable in this example will be described. In this focusing system, a blur degree of the image is detected to obtain focusing information. The image in a case where the object is in-focus condition is sharp, whereas the image in a case where the object is out-of-focus condition is blurred. The image is detected by the image sensor, the contrast in a focus detection area of the image pickup device in the long-side direction (the X-axis direction) is calculated using the resultant electric signal, and the focusing state is detected based on a value of the contrast.

The contrast C is defined by the following equation:

$$C = (Imax - Imin)/(Imax + Imin),$$

in which Imax is the maximum value of light intensity, and Imin is the minimum value of the light intensity.

Various algorithms (evaluation functions) to be actually used in the contrast detection are known. For example, a difference between the maximum value and the minimum value of the intensity of the electric signal obtained from the image sensor is detected according to the above definition to directly obtain the blur degree of the image, or increase/decrease of a high-frequency component in the electric signal obtained from the image sensor is detected to detect the contrast.

In this example, the fourth lens unit as a focusing lens unit is moved along the optical axis to detect a light intensity distribution in the focus detection area of the image pickup device in the X-axis direction based on signal output intensities of pixels arranged in the X-axis direction, and the contrast is detected from the maximum value and the minimum value of the signal output intensity in the focus detection area.

To simplify the description, a case where black and white stripes alternately arranged in the long-side direction of the effective image pickup region of the image pickup device are used as an object will be described.

Figures 11A, 11B, 11C:
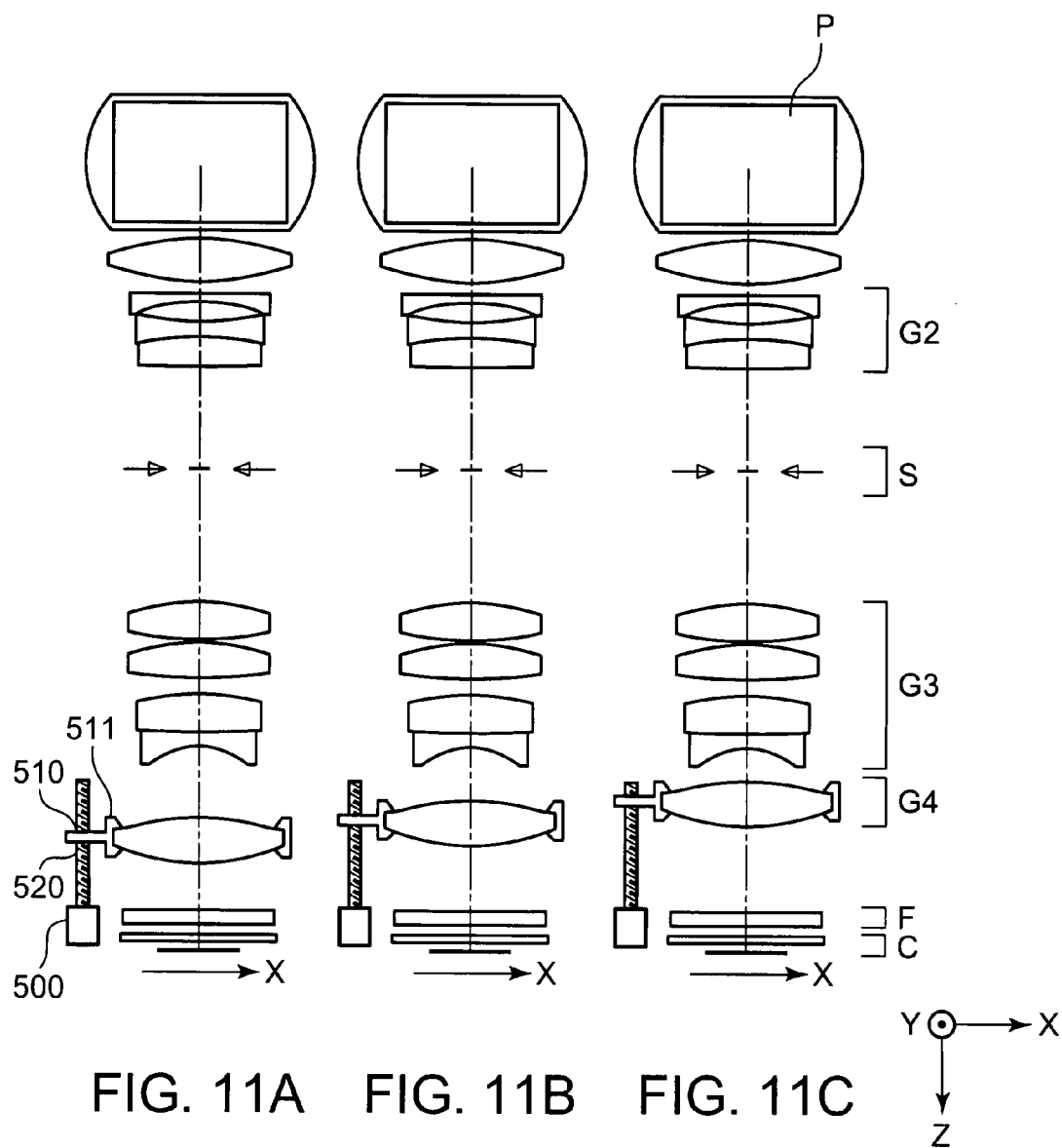
FIGS. 11A to 11C are diagrams of the zoom lens system as viewed from a rear side of the camera (lenses after reflection are shown in sectional views)

FIGS. 11A to 11C are diagrams of the zoom lens system as viewed from a rear side of the camera (lenses after reflection are shown in sectional views), FIG. 11A is a diagram showing a position of the fourth lens unit when focused at infinity (state A), FIG. 11B is a diagram showing a position of the fourth lens unit when focused at a short distance (state B), and FIG. 11C is a diagram showing a position of the fourth lens unit when focused at a distance shorter than that of the state B (state C). Coordinate axes are shown at a lower right portion of FIG. 11C, and a Y-axis is directed so as to rise from a drawing sheet surface.

Figure 12:
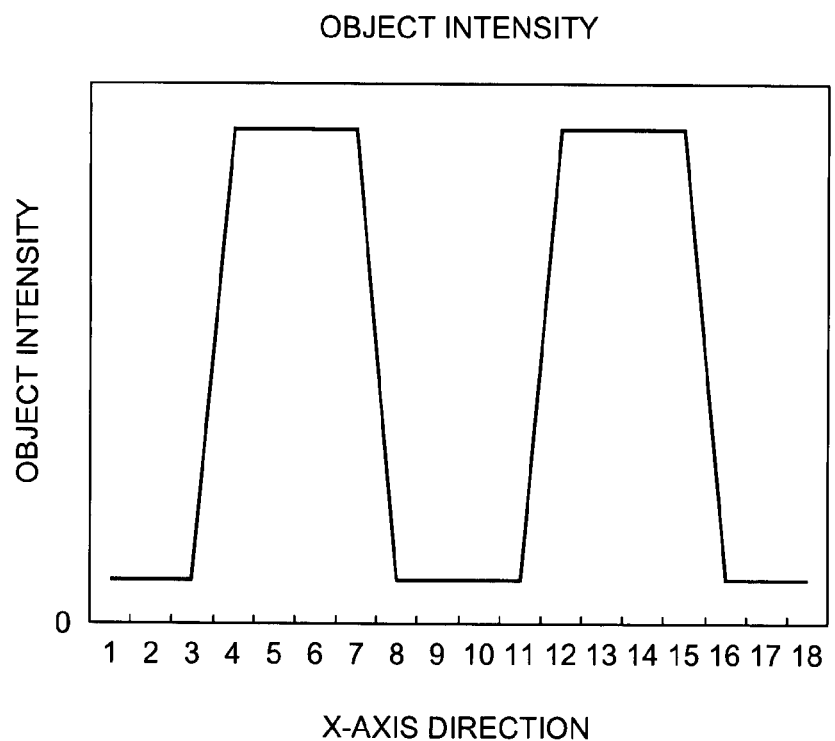
FIG. 12 is a diagram showing an intensity distribution of an object in a direction corresponding to the X-axis direction of the area where the focus detection is performed.

FIG. 12 is a diagram showing an intensity distribution of an object in a direction corresponding to the X-axis direction of the area where the focus detection is performed.

Figure 13A:
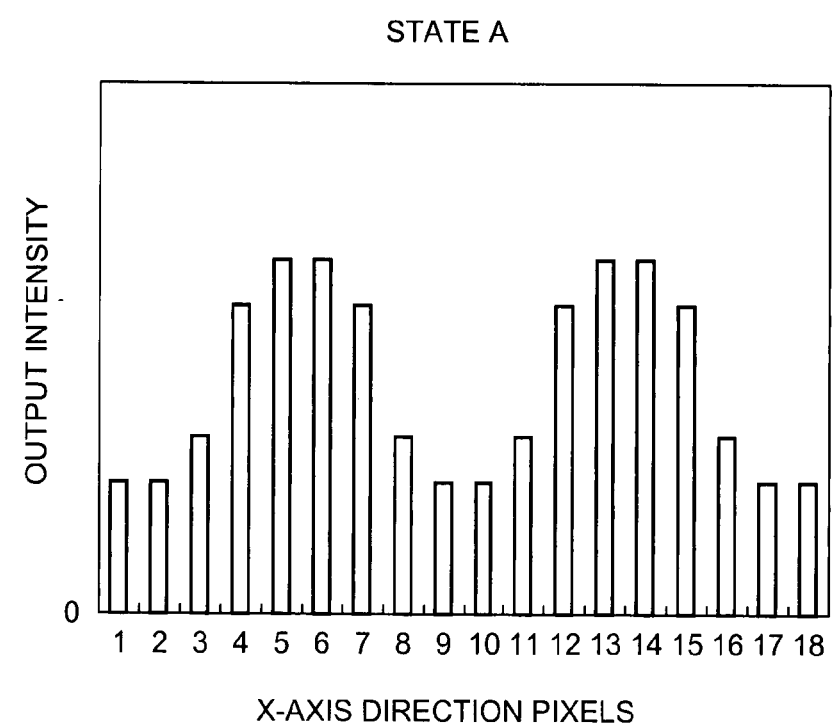
FIGS. 13A to 13C are diagrams showing distributions of the signal output intensity obtained from each pixel in the X-axis direction of the focus detection area of the image sensor at a time when the image of the object is formed at the effective image pickup region of the CCD image sensor by the photographing optical system.
Figure 13B:
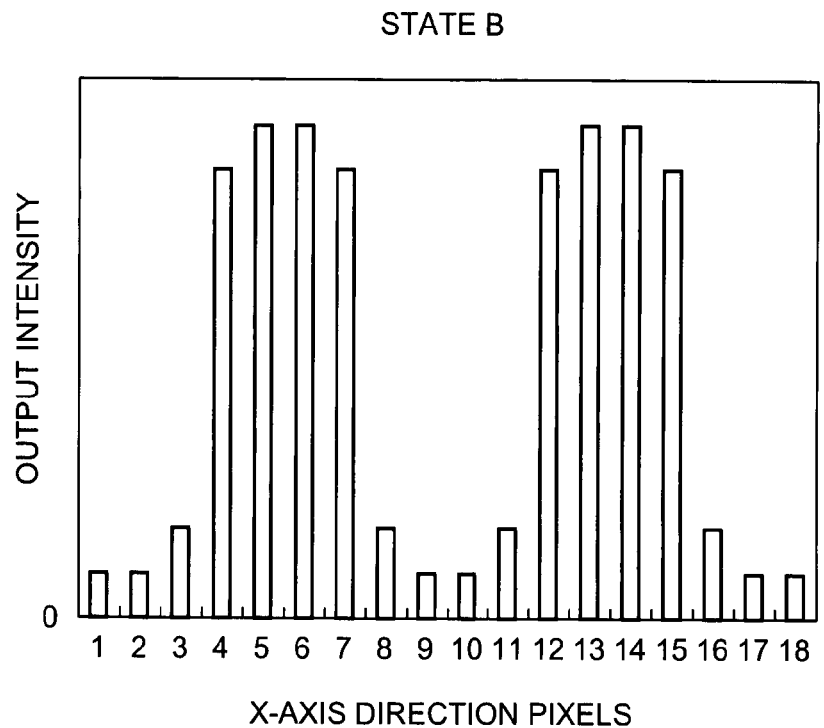
Figure 13C:
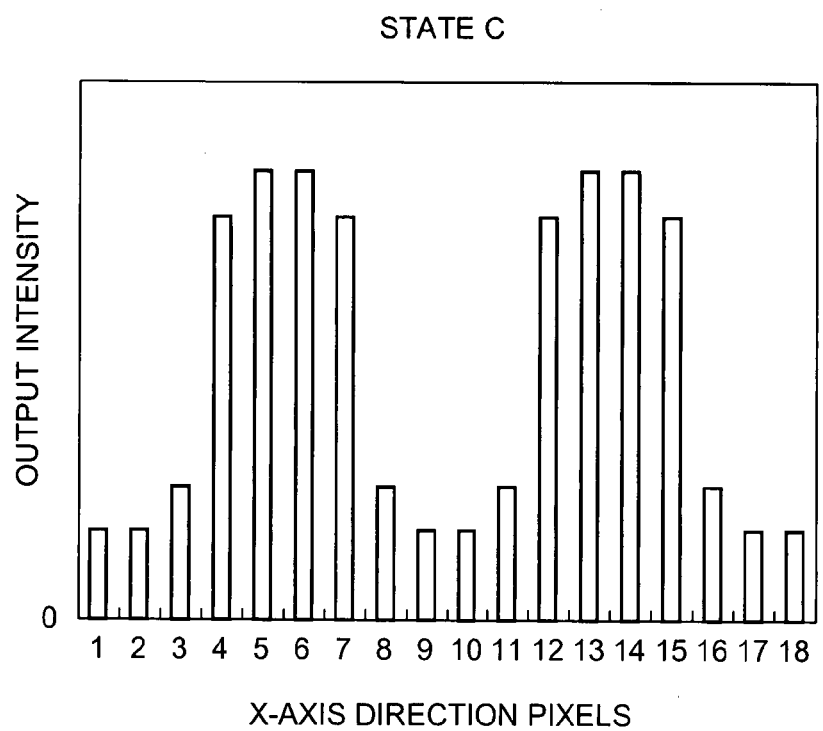

FIGS. 13A to 13C are diagrams showing distributions of the signal output intensity obtained from each pixel in the X-axis direction of the focus detection area of the image sensor at a time when the image of the object is formed at the effective image pickup region of the CCD image sensor 149 by the photographing optical system, FIG. 13A shows a distribution of the signal output intensity in the state A of the photographing optical system, FIG. 13B shows a distribution of the signal output intensity in the state B, and FIG. 13C shows a distribution of the signal output intensity in the state C.

An operation of the example will be described.

When the shutter release button 145 included in the operating section 112 of the digital camera 140 is half pressed, a signal indicating this state is sent to the control section 113. The control section 113 sends a signal to the zoom lens driving circuit 130 in order to move the fourth lens unit as the focusing lens unit to a position where the unit is focused at infinity. The zoom lens driving circuit 130 is electrically connected to a focusing driving motor 500. The fourth lens unit G4 is held by a lens frame 511 having a screw hole 510. An internal thread formed at the screw hole 510 engages with an external thread formed at a shaft 520 of the motor 500, and the fourth lens unit G4 is mechanically connected to the motor 500 via the lens frame 511 and the shaft 520. The zoom lens driving circuit 130 can drive the motor 500 to regulate the position of the fourth lens unit G4.

In the state A in which the photographing optical system is focused at infinity, the signal output shown in FIG. 13A is obtained from the pixels arranged in the long-side direction (the X-axis direction) of the focus detection area of the effective image pickup region of the CCD image sensor 149. This signal is sent to the control section 113 via the CDS/ADC section 124, the temporary storage memory 117 and the bus 122. The control section 113 calculates the contrast from this signal output based on the maximum and minimum values of the signal output intensity. That is, a contrast C is calculated by the following equation:

$$C = (Smax - Smin)/(Smax + Smin),$$

in which Smax is the maximum value of the signal output intensity of the focus detection area, and Smin is the minimum value.

Subsequently, the control section 113 sends, to the zoom lens driving circuit 130, a signal to execute control so that the fourth lens unit G4 as the focusing lens unit is gradually extended. In response to the signal, the zoom lens driving circuit 130 drives the motor to extend the fourth lens unit G4. When the fourth lens unit G4 is extended, the short distance is gradually focused. Every time the control section 113 moves the fourth lens unit G4, the control section calculates the contrast in the same manner as described above.

FIG. 13B shows the distribution of the output signal intensity from the CCD image sensor 149 in a state in which the contrast value is largest, and this case corresponds to a case where the fourth lens unit is positioned in the state B shown in FIG. 11B.

When the fourth lens unit G4 is further extended to focus a shorter distance than in the state B, the contrast of the image drops. FIG. 13C shows the distribution of the output signal intensity from the CCD image sensor 149 at this time, and this case corresponds to a case where the fourth lens unit is positioned in the state C shown in FIG. 11C.

As described above, in a case where the control section 113 judges that change of the contrast generated by extending the focusing lens unit changes from increase to decrease, that is, the state C shown in FIGS. 11C and 13C is obtained, the control section 113 sends, to the zoom lens driving circuit 130, a command to reverses a movement direction of the focusing lens unit and to move the focusing lens unit to a state in which the contrast is highest during the driving of the focusing, that is, the state B. The zoom lens driving circuit 130 drives the motor to move the fourth lens unit G4 to the position of the state B, thereby ending the focusing operation.

In this example, the contrast is detected in a predetermined initial state of the focusing lens unit (the state in which the unit is focused at infinity in the present example), the focusing lens unit is gradually moved from the state to detect the contrast for each movement, and an optimum focused state is detected.

In addition, a plurality of portions (the positions of the focusing lens unit) in which the contrast is to be measured may be predetermined, the contrast may be measured in the plurality of states, and an extended position of the focusing lens unit where the contrast is supposed to be highest may be calculated from correlation of measured values to determine the focused position.

Moreover, a focusing system using the contrast in the Y-axis direction or another focusing system (e.g., a focusing system using a phase difference) may be used together.

Since the digital camera 140 constituted in this manner has a sufficiently large angle of view of the photographing optical system 141 in the wide-angle end, has a compact constitution and a high zoom ratio, and has an image forming performance remarkably stabilized in the whole zoom region, a high performance, miniaturization and wider angle can be realized. Furthermore, a quick focusing operation can be performed in the wide-angle end and the telephoto end.

In the above example, an example in which the area of the aperture of the aperture stop changes from the wide-angle end to the telephoto end and a ratio between the size of the aperture in the short-side direction and the size of the aperture in the long-side direction is set to be constant. When the area of the aperture of the aperture stop is set to be constant as described above, the constitution can further be simplified. For example, a stationary aperture stop having a constant aperture size of $S_{12x}=1.957$, $S_{12y}=1.450$ may be constituted.

Moreover, the ratio of the size of the aperture is not limited to that of the above example. Furthermore, when the aperture stop is narrowed down, a ratio between the size of the aperture in the X-axis direction and the size of the aperture in the Y-axis direction may be changed. Furthermore, a mechanism which changes the area of the aperture stop to regulate the light quantity may be constituted. An example of the mechanism will hereinafter be described.

Figure 9:
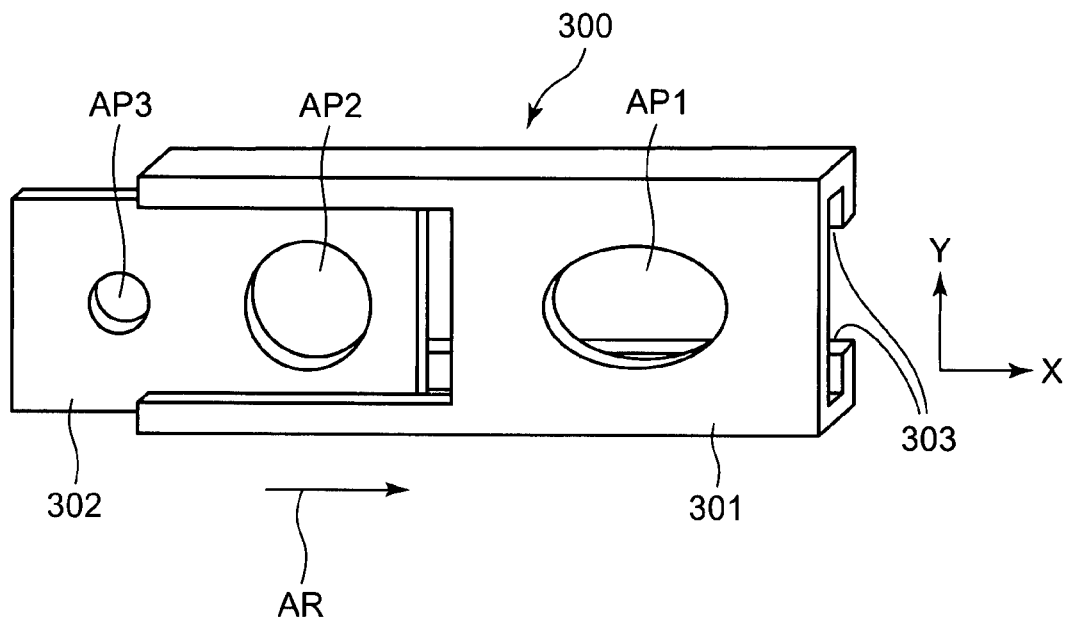
FIG. 9 is a diagram showing a schematic constitution of another example of the aperture stop.

FIG. 9 shows a schematic constitution of an aperture stop section 300. An aperture API having an elliptic shape is formed on an aperture stop main body 301, which is used in a state that an aperture area is maximized. Moreover, the area of the aperture of the aperture stop is controlled by inserting and detaching an auxiliary aperture stop 302. In FIG. 9, the aperture stop main body 301 is provided with two rails 303 in the X-axis direction. The 302 is constituted so as to be movable along the rails 303 in the X-axis direction.

The auxiliary aperture stop 302 is provided with two types of apertures including a circular aperture AP2 and circular aperture AP3. The aperture AP3 has an aperture area smaller than that of the aperture AP2. When the auxiliary aperture stop 302 is moved along the rails 303 in the X-axis direction, the aperture AP2 or AP3 can be positioned so as to be superimposed on the elliptic aperture API to change the area of the aperture of the aperture stop. In the present example, the aperture stop areas of three stages of the apertures AP1, AP2 and AP3 can be obtained.

Moreover, in a state in which the aperture is narrowed down, that is, in a state in which the aperture AP3 is used as the aperture of the aperture stop, a ratio between the size of the aperture stop in the X-axis direction and the size of the aperture stop in the Y-axis direction is set to 1 ($D_{xm}/D_{ym}=1$). In consequence, the influence of the diffraction in the state in which the aperture is narrowed down is easily suppressed. This example may be employed in the above-mentioned embodiment.

Figure 10A:
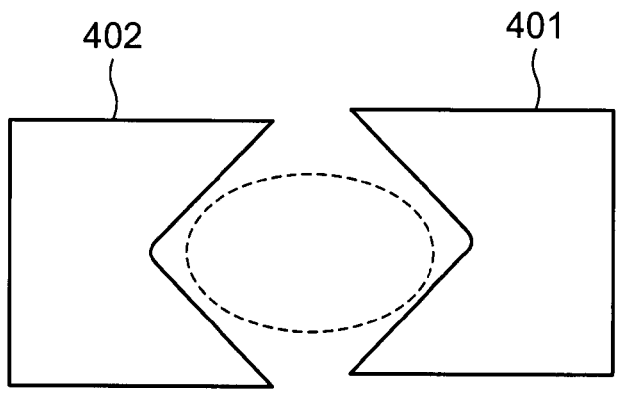
FIG. 10 is a diagram showing a schematic constitution of still another example of the aperture stop.
Figure 10B:
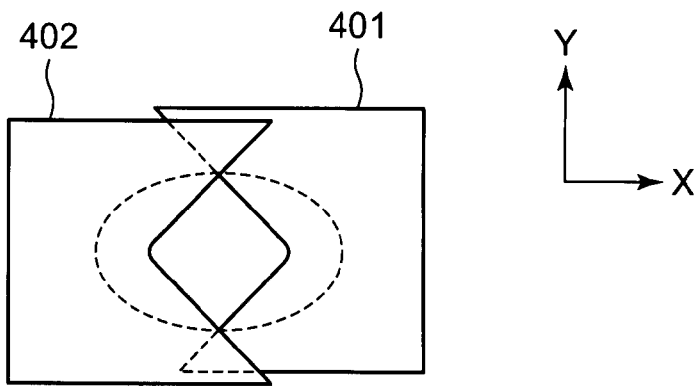

Next, another example in which the aperture area of the aperture stop is varied will be described. In this example, aperture stop blades 401, 402 movable in the X-axis direction as shown in FIGS. 10A, 10B and 10C are arranged on a front-surface side or a back-surface side of an elliptic aperture of the aperture stop.

When the aperture stop blades 401, 402 come close to or away from each other in the X-axis direction, the area of the aperture can continuously be controlled. FIG. 10A shows a state in which the area of the aperture is maximized, and the elliptic aperture determines the area of the aperture of the aperture stop. FIG. 10B shows an intermediate state, and FIG. 10C shows a state in which the aperture is narrowed down most.

Figure 10C:
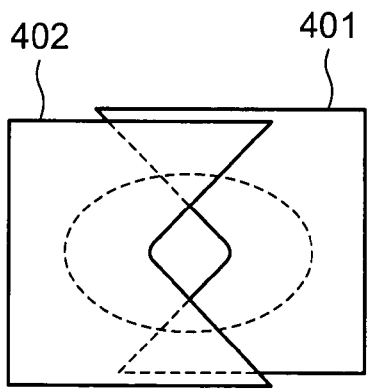

In a state of FIG. 10C in which the aperture is narrowed down to minimize the area of the aperture, the aperture substantially has a square shape, and is constituted so that opposite ends of the aperture in the X-axis direction are slightly rounded. Here, control is performed so as to obtain $D_{xm}/D_{ym}$ nearly equal to 0.8.

It is to be noted that a constitution in which the area of the aperture of the aperture stop is varied is not limited to the above constitution, and a constitution other than the above constitution may be employed.

An electronic image pickup apparatus according to the present invention can easily suppress generation of ghost or flare, and easily secure an image forming performance, even when the apparatus is thinned. As an example of the electronic image pickup apparatus, the digital camera has been described, but the present invention is applicable broadly to a video camera and the like.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An electronic image pickup apparatus comprising:

a zoom lens system which forms an image of an object; and an electronic image pickup device which receives the image formed by the zoom lens system to convert the image into an electric signal, the zoom lens system comprising:

a plurality of lens units arranged along an optical path including an optical axis which extends from an object side to an image surface, each space between the plurality of lens units which are adjacent to each other being changed to change a focal length of the zoom lens system, among the plurality of lens units, a first lens unit which is a lens unit arranged closest to an object side comprising a reflective surface which reflects the optical path, the zoom lens system further comprising:

an aperture stop having an aperture which is disposed on the optical path reflected by the reflective surface of the first lens unit, the aperture of the aperture stop having a non-circular shape in a state in which an area of the aperture is maximized, in the state in which the area of the aperture is maximized, a length of the aperture in a direction along an incident optical axis that enters the first lens unit being smaller than a length of the aperture in a direction vertical to the incident optical axis that enters the first lens unit and a reflected optical axis reflected by the reflective surface, a lens arranged closest to an image side on the optical path extending from the reflective surface to the image surface having a non-circular outer shape, the outer shape of the lens being formed so that a length of the outer shape in the direction along the incident optical axis which enters the first lens unit being smaller than the length of the outer shape in the direction vertical to the incident optical axis which enters the first lens unit and the reflected optical axis reflected by the reflective surface, the following condition being satisfied:

$$1.10 < D_x/D_y < 1.75 \quad (1),$$

in which $D_y$ is a length of the aperture in the direction along the incident optical axis that enters the first lens unit in the state where the area of the aperture is maximized, and $D_x$ is a length of the aperture in the direction vertical to the incident optical axis that enters the first lens unit and the reflected optical axis reflected by the reflective surface of the first lens unit in the state where the area of the aperture is maximized.

2. The electronic image pickup apparatus according to claim 1, wherein the aperture has a constant area.

3. The electronic image pickup apparatus according to claim 1, wherein the area of the aperture of the aperture stop in a state in which the F-number is minimized in a wide-angle end is smaller than that in a state in which the F-number is minimized in a telephoto end, and the shape of the aperture of the aperture stop satisfies the following condition in the state in which the F-number is minimized in the wide-angle end:

$$1.10 < D_{xW}/D_{yW} < 1.75 \quad (2),$$

in which $D_{yW}$ is a length of the aperture in the direction along the incident optical axis that enters the first lens unit in a state where the area of the aperture is maximized in the wide-angle end, and $D_{xW}$ is a length of the aperture in the direction vertical to the incident optical axis that enters the first lens unit and the reflected optical axis reflected by the reflective surface of the first lens unit in the state in which the area of the aperture is maximized in the wide-angle end.

4. The electronic image pickup apparatus according to claim 1, wherein the area of the aperture of the aperture stop is variable, and the following condition is satisfied in a state in which the area of the aperture is minimized:

$$D_x/D_y > D_{xm}/D_{ym} \geq 0.5 \quad (3),$$

in which $D_{ym}$ is a length of the aperture in the direction along the incident optical axis that enters the first lens unit in the state where the area of the aperture is minimized, and $D_{xm}$ is a length of the aperture in the direction vertical to the incident optical axis that enters the first lens unit and the reflected optical axis reflected by the reflective surface of the first lens unit in the state where the area of the aperture is minimized.

5. The electronic image pickup apparatus according to claim 4, wherein the zoom lens system comprises a mechanism which changes the area of the aperture.

6. The electronic image pickup apparatus according to claim 5, wherein the mechanism which changes the area of the aperture includes an auxiliary aperture stop which moves in a direction where the length of the aperture is relatively larger when the area of the aperture of the aperture stop is maximized and which has a fixed aperture shape.

7. The electronic image pickup apparatus according to claim 4, wherein the mechanism which changes the area of the aperture is two aperture stop blades which move in a direction where the length of the aperture is relatively larger when the area of the aperture of the aperture stop is maximized.

8. The electronic image pickup apparatus according to claim 1, wherein a clear aperture of a lens surface closest to the aperture stop on the object side from the aperture stop satisfies the following condition:

$$1.15 < F_x/F_y < 1.80 \quad (4),$$

in which $F_y$ is a length of the clear aperture of the lens surface closest to the aperture stop on the object side from the aperture stop in the direction along the incident optical axis that enters the first lens unit, and $F_x$ is a length of the clear aperture of the lens surface closest to the aperture stop on the object side from the aperture stop along the direction vertical to the incident optical axis that enters the first lens unit and the reflected optical axis reflected by the reflective surface of the first lens unit.

9. The electronic image pickup apparatus according to claim 1, wherein a clear aperture of a lens surface closest to the aperture stop on an image side from the aperture stop satisfies the following condition:

$$1.15 < R_x/R_y < 1.80 \quad (5),$$

in which $R_y$ is a length of the clear aperture of the lens surface closest to the aperture stop on the image side from the aperture stop in the direction along the incident optical axis that enters the first lens unit, and $R_x$ is a length of the clear aperture of the lens surface closest to the aperture stop on the image side from the aperture stop in the direction vertical to the incident optical axis that enters the first lens unit and the reflected optical axis reflected by the reflective surface of the first lens unit.

10. The electronic image pickup apparatus according to claim 1, wherein an effective image pickup region of a light receiving surface of the electronic image pickup device has a rectangular shape having a short-side direction and a long-side direction, and the electronic image pickup device is arranged so that the long-side direction of the effective image pickup region is the direction vertical to the incident optical axis which enters the first lens unit and the reflected optical axis reflected by the reflective surface of the first lens unit, the electronic image pickup apparatus further comprising:

a control section which detects focusing information based on a contrast of an image formed on the electronic image pickup device in the long-side direction.

11. The electronic image pickup apparatus according to claim 1, wherein the electronic image pickup device satisfies the following condition:

$$1.45 \, \mu m < P < 2.15 \, \mu m \qquad (6),$$

in which P is an average value of pixel pitches in a light receiving region of the electronic image pickup device.

12. The electronic image pickup apparatus according to claim 7, wherein the length of the outer shape of the lens closest to the object side from the aperture stop in the direction along the incident optical axis which enters the first lens unit is smaller than the length of the outer shape in the direction vertical to the incident optical axis which enters the first lens unit and the reflected optical axis reflected by the reflective surface of the first lens unit.

13. The electronic image pickup apparatus according to claim 8, wherein the length of the outer shape of the lens closest to the aperture stop on the image side from the aperture stop in the direction along the incident optical axis which enters the first lens unit is smaller than the length of the outer shape in the direction vertical to the incident optical axis which enters the first lens unit and the reflected optical axis reflected by the reflective surface of the first lens unit.

\* \* \* \* \*